(12) United States Patent
Ikkaku

(10) Patent No.: US 11,096,023 B2
(45) Date of Patent: Aug. 17, 2021

(54) STORAGE MEDIUM, DATA COLLECTING DEVICE, AND DATA COLLECTING METHOD

(71) Applicant: FUJITSU LIMITED, Kawasaki (JP)

(72) Inventor: Kento Ikkaku, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 16/722,065

(22) Filed: Dec. 20, 2019

(65) Prior Publication Data

US 2020/0221270 A1   Jul. 9, 2020

(30) Foreign Application Priority Data

Jan. 9, 2019   (JP) .............................. JP2019-001529

(51) Int. Cl.
*H04W 4/38* (2018.01)
*H04Q 9/02* (2006.01)
*G01S 19/03* (2010.01)

(52) U.S. Cl.
CPC ............. *H04W 4/38* (2018.02); *H04Q 9/02* (2013.01); *H04Q 2209/10* (2013.01); *H04Q 2209/40* (2013.01)

(58) Field of Classification Search
None
See application file for complete search history.

(56) References Cited

U.S. PATENT DOCUMENTS

| | | | |
|---|---|---|---|
| 2012/0259588 A1 | 10/2012 | Nakazawa et al. | |
| 2016/0197999 A1* | 7/2016 | Chun | H04L 67/12 709/217 |
| 2017/0092139 A1* | 3/2017 | Wang | G01S 13/87 |
| 2018/0365977 A1 | 12/2018 | Inoue et al. | |
| 2019/0349433 A1* | 11/2019 | Smith | H04L 69/18 |
| 2020/0090208 A1* | 3/2020 | Reichenbach | G06Q 40/08 |

FOREIGN PATENT DOCUMENTS

| | | |
|---|---|---|
| JP | 2011/150501 | 8/2011 |
| WO | 2011/077533 A1 | 6/2011 |
| WO | 2017/098866 | 6/2017 |

\* cited by examiner

*Primary Examiner* — Curtis A Kuntz
*Assistant Examiner* — Jerold B Murphy
(74) *Attorney, Agent, or Firm* — Fujitsu Patent Center

(57) ABSTRACT

A storage medium storing a data collecting program for making a process performed, the process includes identifying a data obtainment target period and a plurality of areas based on a request from a user, extracting a plurality of apparatuses present in each area in each time frame as a data obtainment unit of the period, assigning, for each set of the time frame and the area, an apparatus as a collection source of a data block corresponding to the set of the time frame and the area based on a given condition from among the extracted plurality of apparatuses, and collecting the data block from the apparatus assigned as the collection source for each set of the time frame and the area.

15 Claims, 28 Drawing Sheets

FIG. 1
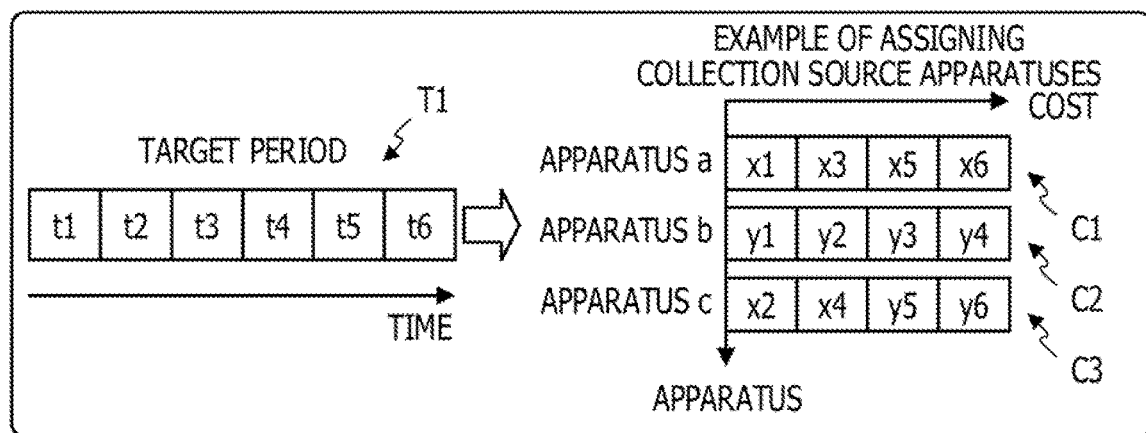
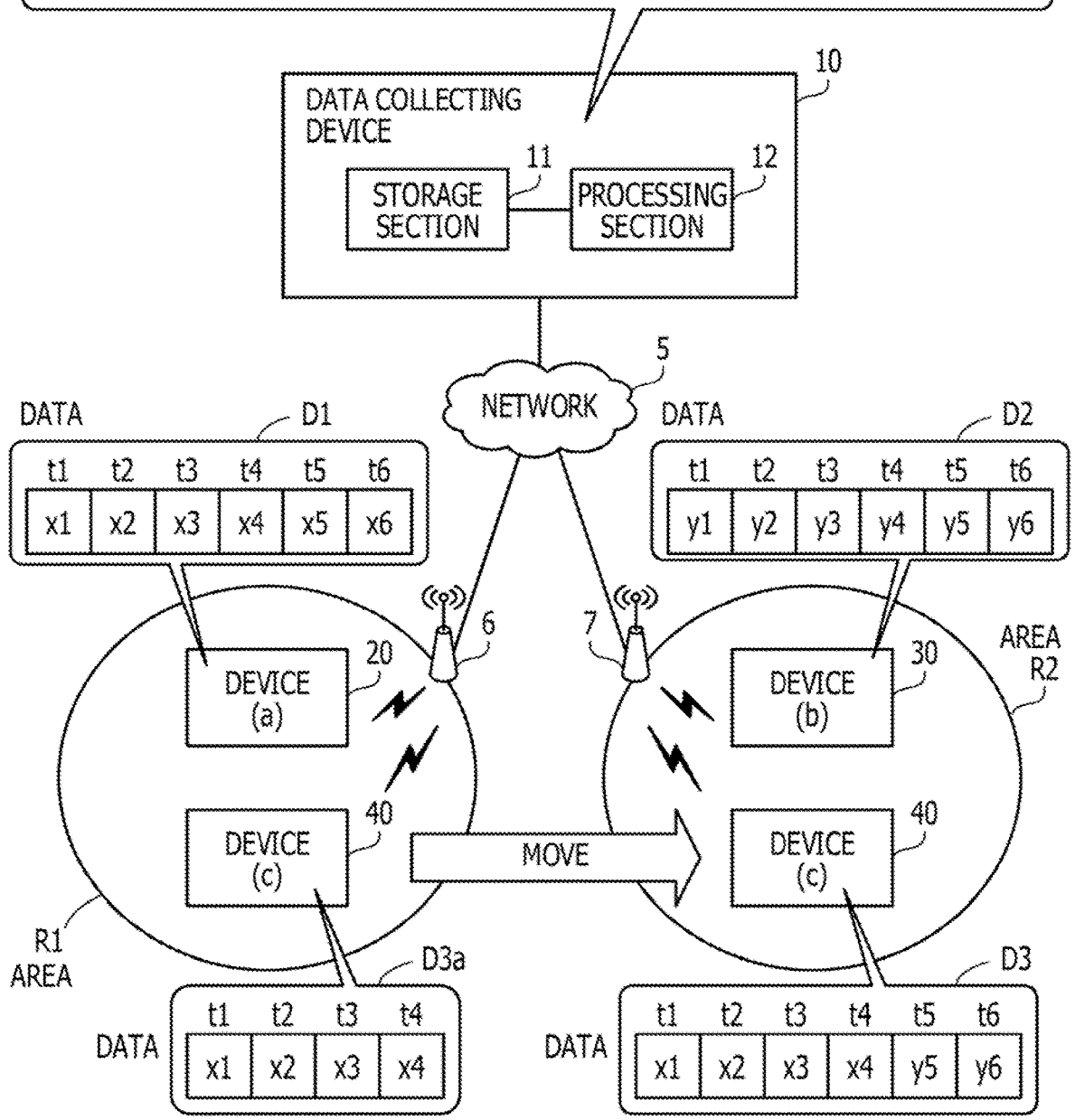

FIG. 12

META-INFORMATION STORAGE SECTION — 120

EDGE HISTORY TABLE — 121, 122, 123

| EDGE ID | TIME | POSITIONAL INFORMATION | LOAD INFORMATION |
|---|---|---|---|
| E1 | 17:01 | A | 70% |
| ... | ... | ... | ... |

FIG. 13

| \_ 120 |
|---|
| META-INFORMATION STORAGE SECTION |

| HASH VALUE TABLE | | | | |
|---|---|---|---|---|
| TIME SLOT ID | EDGE E1 | EDGE E2 | EDGE E3 | ... |
| 1 | h(17:01,A) | h(17:01,A) | h(17:01,B) | ... |
| 2 | h(17:02,A) | h(17:02,B) | h(17:02,B) | ... |
| 3 | h(17:03,B) | h(17:03,B) | h(17:03,C) | ... |
| 4 | h(17:04,B) | h(17:04,C) | h(17:04,D) | ... |
| ... | ... | ... | ... | ... |

FIG. 14

| SENSOR INFORMATION STORAGE SECTION | | |
|---|---|---|
| SENSOR DATA | | |
| TIME | POSITIONAL INFORMATION | AMOUNT OF RAINFALL |
| 17:01:01 | A | 0.05 |
| 17:01:02 | A | 0.05 |
| 17:01:03 | A | 0.05 |
| ... | ... | ... |
| 18:00:59 | D | 0.04 |

FIG. 15

PREPROCESSING RESULT STORAGE SECTION — 220

PREPROCESSING RESULT DATA — 221

| TIME | POSITIONAL INFORMATION | AMOUNT OF RAINFALL |
|---|---|---|
| 17:01 | A | 0.05 |
| 17:02 | A | 0.06 |
| 17:03 | B | 0.05 |
| ... | ... | ... |
| 18:00 | D | 0.04 |

FIG. 16

COLLECTED INFORMATION STORAGE SECTION

| COLLECTED DATA | | | |
|---|---|---|---|
| EDGE ID | TIME | AREA | AMOUNT OF RAINFALL |
| E1 | 17:01 | A | 0.05 |
| E1 | 17:02 | A | 0.06 |
| E1 | 17:03 | B | 0.05 |
| ... | ... | ... | ... |
| E1 | 18:00 | D | 0.04 |

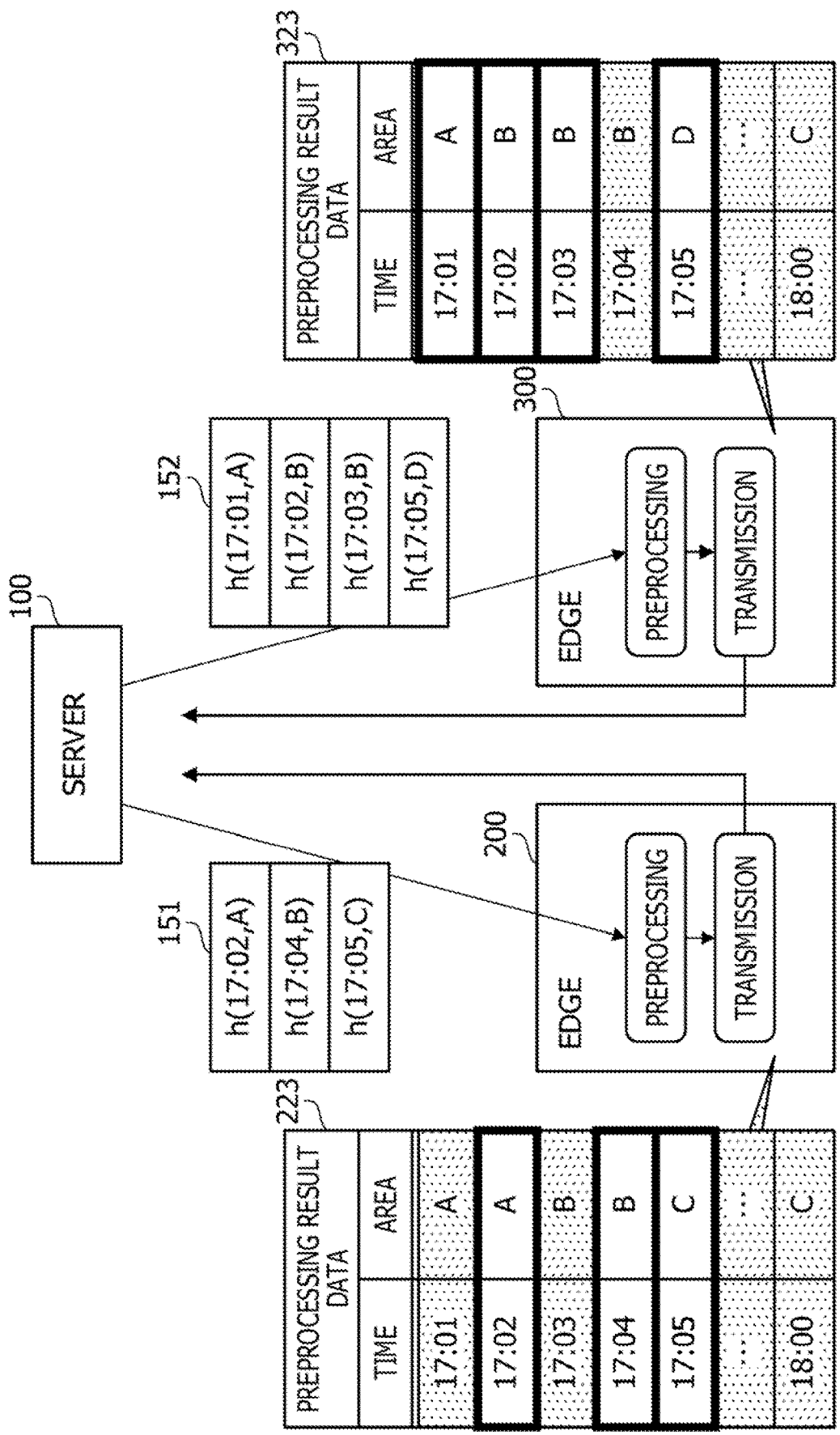

STORAGE MEDIUM, DATA COLLECTING DEVICE, AND DATA COLLECTING METHOD

CROSS-REFERENCE TO RELATED APPLICATION

This application is based upon and claims the benefit of priority of the prior Japanese Patent Application No. 2019-1529, filed on Jan. 9, 2019, the entire contents of which are incorporated herein by reference.

FIELD

The embodiments discussed herein are related to a storage medium, a data collecting device, and a data collecting method.

BACKGROUND

A system is used which collects data accumulated in apparatuses including sensors in response to a request of a user, and analyzes the data. For example, a system is proposed which alternately excludes odd-numbered devices or even-numbered devices among a plurality of devices arranged at geographically different positions, and collects data of devices. The proposed system interpolates the value of the data of an excluded device by using the data collected without being excluded.

Incidentally, a performance data collecting device is proposed which groups processors whose performance data values are within a range of approximate values, and sets the transmission intervals of performance data of processors other than a representative processor of the group longer than the transmission intervals of performance data of the representative processor.

In addition, an information processing device is also proposed which assigns collection target data scheduled for data collection within a preset time to each data collecting device in a distributed manner, generates a data collection pattern for collecting the collection target data by each data collecting device, and distributes the data collection pattern to each data collecting device.

International Publication No. 2017/098866, International Publication No. 2011/077533, Japanese Laid-open Patent Publication No. 2011-150501, and the like, for example, are disclosed as the related art.

SUMMARY

According to an aspect of the embodiment, a storage medium storing a data collecting program for making a process performed, the process includes identifying a data obtainment target period and a plurality of areas based on a request from a user, extracting a plurality of apparatuses present in each area in each time frame as a data obtainment unit of the period, assigning, for each set of the time frame and the area, an apparatus as a collection source of a data block corresponding to the set of the time frame and the area based on a given condition from among the extracted plurality of apparatuses, and collecting the data block from the apparatus assigned as the collection source for each set of the time frame and the area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a data collecting device according to a first embodiment;

FIG. 12 is a diagram illustrating an example of an edge history table;

FIG. 13 a diagram illustrating an example of a hash value table;

FIG. 14 is a diagram illustrating an example of sensor data;

FIG. 15 is a diagram illustrating an example of preprocessing result data;

FIG. 16 is a diagram illustrating an example of collected data;

FIG. 24 is a diagram illustrating an example of data collection from edges by a server;

DESCRIPTION OF EMBODIMENTS

Figure 2:
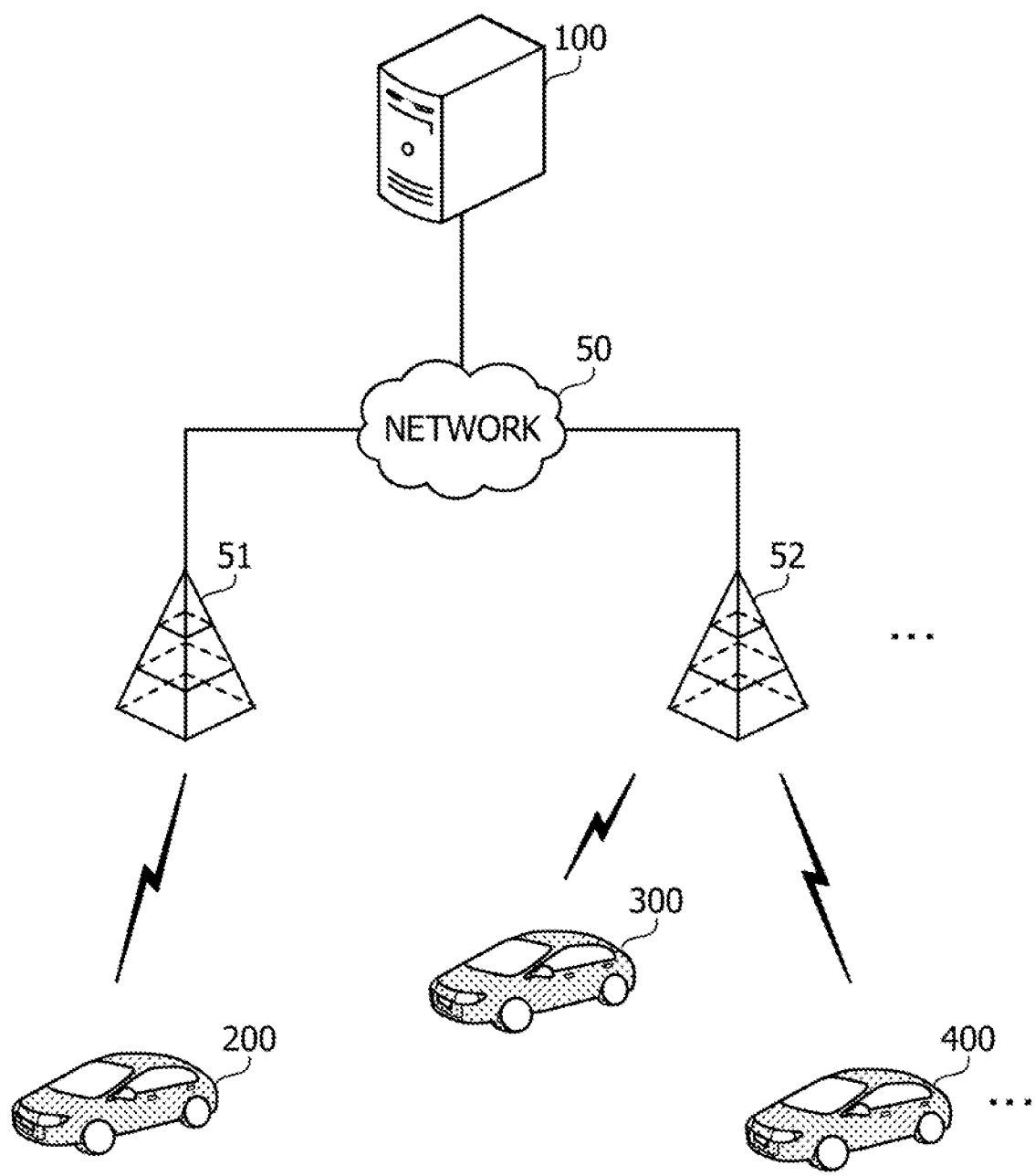
FIG. 2 is a diagram illustrating an example of a data collecting system according to a second embodiment.

In a case where at least a part of a plurality of apparatuses as data collection sources are movable, the apparatus may be moved within a data collection target period. In this case, there may be an area in which data collection is omitted when targets to be excluded are fixedly determined as in a case of alternately excluding even-numbered or odd-numbered devices from devices numbered in advance as in the above-described proposal.

Therefore, in the case where at least a part of the plurality of apparatuses are movable, data in the whole of the data collection target period may be collected from all of the apparatuses. However, apparatuses located relatively close to each other may accumulate substantially the same values such as those of precipitation, temperature, or the like. There is thus a possibility of collecting duplicate information when collecting the data in the whole of the target period from all of the apparatuses.

In one aspect, it is an object of the present embodiments to provide a data collecting program, a data collecting device, and a data collecting method that are able to avoid collecting duplicate information.

Present embodiments will hereinafter be described with reference to the drawings.

First Embodiment

A first embodiment will be described.

FIG. 1 is a diagram illustrating a data collecting device according to the first embodiment.

The data collecting device 10 communicates with apparatuses 20, 30, and 40 via a network 5. When the data collecting device 10 receives a request for data analysis or the like from a user, the data collecting device 10 collects data accumulated in the apparatuses 20, 30, and 40. The apparatuses 20, 30, and 40 include a sensor that detects ambient physical information, a memory that accumulates data detected by the sensor, and a wireless communicating function. The physical information may include various kinds of information such as an amount of rainfall, temperature, humidity, a volume of air, an amount of vibration, an atmospheric substance concentration, an amount of radiation, an electromagnetic wave (for example, information converted into video or the like), sound, or the like.

At least a part of the apparatuses 20, 30, and 40 are movable. Being "movable" includes autonomous movement of an apparatus in question, movement of the apparatus in question according to an operation of the user or the like, or movement of the apparatus together with a moving body mounted with the apparatus in question. The moving body is, for example, an animal, a vehicle, a vessel, a flight vehicle, a robot, and the like. In addition, the identifier of the apparatus 20 is an "apparatus a." The identifier of the apparatus 30 is an "apparatus b." The identifier of the apparatus 40 is an "apparatus c."

The network 5 is coupled with base stations 6 and 7. The base station 6 wirelessly communicates with apparatuses present in an area R1. The base station 7 wirelessly communicates with apparatuses present in an area R2.

The data collecting device 10 includes a storage section 11 and a processing section 12. The storage section 11 may be a volatile storage device such as a random access memory (RAM) or the like, or may be a nonvolatile storage device such as a hard disk drive (HDD), a flash memory, or the like. The processing section 12 may include a central processing unit (CPU), a digital signal processor (DSP), an application specific integrated circuit (ASIC), a field programmable gate array (FPGA), or the like. The processing section 12 may be a processor that executes a program. The "processor" referred to here may include a set of a plurality of processors (multiprocessor).

The storage section 11 stores data used for processing of the processing section 12. The storage section 11, for example, stores data collected by the processing section 12 from the apparatuses 20, 30, and 40. The data collected by the processing section 12 from the apparatuses 20, 30, and 40, for example, includes data detected by the sensors of the respective apparatuses and collected in response to a request of the user. In addition, the data collected by the processing section 12 from the apparatuses 20, 30, and 40 may, for example, include information indicating collection times, the positions of the respective apparatuses at the collection times, and loads or remaining fuel amounts (remaining battery capacities) of the apparatuses or the like, the information being collected by the processing section 12 from the apparatuses 20, 30, and 40 periodically. The storage section 11 stores a history (history information) of these pieces of information collected by the processing section 12 from the apparatuses 20, 30, and 40 periodically.

The processing section 12 identifies a data obtainment target period and a plurality of data obtainment target areas based on a request from the user. For example, the user inputs an analysis request specifying a data analysis target period and a region to the data collecting device 10. Then, the processing section 12 identifies a data obtainment target period and a plurality of areas included in the specified region from the input analysis request. The processing section 12 may, for example, identify the plurality of areas by dividing the specified region into divisions of a given size. In an example, the processing section 12 identifies a period T1 as the data obtainment target period, and identifies areas R1 and R2 as the data obtainment target areas.

The processing section 12 extracts a plurality of apparatuses present in each area in each time frame as a data obtainment unit in the identified period. The time frame as a data obtainment unit is a time frame divided in unit times such as one minute, ten minutes, or the like. In an example, the period T1 includes time frames t1, t2, t3, t4, t5, and t6. The time frame t1 is oldest, the time frames t2, t3, . . . become newer in this order, and the time frame t6 is newest. The processing section 12 extracts a plurality of apparatuses present in each of the areas R1 and R2 in each of the time frames t1, t2, t3, t4, t5, and t6. The processing section 12 may extract a plurality of apparatuses present in each of the areas R1 and R2 by referring to a history of positions at which the respective apparatuses were present, the history being stored in the storage section 11.

For example, the processing section 12 extracts the apparatuses 20 and 40 present in the area R1 in each of the time frames t1, t2, t3, and t4. The processing section 12 extracts the apparatus 30 present in the area R2 in each of the time frames t1, t2, t3, and t4. The processing section 12 extracts the apparatus 20 present in the area R1 in each of the time frames t5 and t6. The processing section 12 extracts the apparatuses 30 and 40 present in the area R2 in each of the time frames t5 and t6. In this case, the apparatus 40 moves from the area R1 to the area R2 immediately before the time frame t5.

Here, the apparatus 20 accumulates data D1 obtained in the time frames t1, t2, t3, t4, t5, and t6 in a memory of the apparatus 20. The data D1 includes data blocks x1, x2, x3, x4, x5, and x6 corresponding to the time frames t1, t2, t3, t4, t5, and t6. In addition, the apparatus 30 accumulates data D2 obtained in the time frames t1, t2, t3, t4, t5, and t6 in a memory of the apparatus 30. The data D2 includes data blocks y1, y2, y3, y4, y5, and y6 corresponding to the time frames t1, t2, t3, t4, t5, and t6. Further, the apparatus 40 accumulates data D3 obtained in the time frames t1, t2, t3, t4, t5, and t6 in a memory of the apparatus 40. The data D3 includes data blocks x1, x2, x3, x4, y5, and y6 corresponding to the time frames t1, t2, t3, t4, t5, and t6. The data blocks include values indicating the physical information obtained by the sensors of the respective apparatuses.

Incidentally, in order to facilitate the understanding of the movement of the apparatus 40 between the areas, FIG. 1 illustrates data D3a retained by the apparatus 40 immediately before the apparatus 40 moves from the area R1 to the area R2. The data D3a includes the data blocks x1, x2, x3, and x4 corresponding to the time frames t1, t2, t3, and t4.

In representations such as the above "data block x1" and the like, data blocks including identical or approximate values (coinciding with each other within a given error range, for example) are identified by the same symbol (for example, "x1" or the like). For example, apparatuses present in a same area in a same time frame accumulate data blocks of identical or approximate contents (or there is a strong possibility of the apparatuses accumulating data blocks of identical or similar contents). In a case where there are a plurality of apparatuses having data blocks of identical or approximate contents, it suffices to obtain a data block in question from one of the apparatuses. This is because the information of the data block in the other apparatus may be interpolated based on the obtained data block even when the data block is not obtained from the other apparatus on the data collecting device 10 side.

From among the extracted plurality of apparatuses, based on a given condition, for each set of a time frame and an area, the processing section 12 assigns an apparatus as a data block collection source corresponding to the set of the time frame and the area. The given condition is, for example, leveling of cost involved in data transmission of each apparatus. The cost may be a time of data collection from each apparatus, a fuel needed (or power needed) by each apparatus for data transmission, or the like. In addition, the given condition may be the leveling of a remaining fuel (or a remaining battery capacity) after data transmission by each apparatus or the like.

Consideration will be given to the leveling of cost involved in data transmission of each apparatus (transmission cost) as an example. The data collecting device 10 levels the cost, and collects data blocks so as to avoid duplicates. In the present example, the data to be collected for the period T1 and the areas R1 and R2 is the data blocks x1 to x6 for the area R1 and the data blocks y1 to y6 for the area R2. Incidentally, for simplicity, suppose here that the cost needed to collect one data block is the same (Cost=1, for example) for each apparatus. However, as will be described later, the cost may differ according to a load on the apparatus or the like. In addition, suppose that each of the apparatuses 20, 30, and 40 is not assigned any data block to be transmitted (Cost for Each Apparatus=0) before the processing section 12 performs assignment to be illustrated in the following.

Firstly, the apparatuses 20 and 40 are present in the area R1 in the time frame t1. The data block x1 corresponding to the set of the time frame t1 and the area R1 is retained by both of the apparatuses 20 and 40. It suffices to collect the data block x1 from one of the apparatuses 20 and 40. Because there is no data block already assigned to the apparatuses 20 and 40, costs for the apparatuses 20 and 40 are both 0 at this point in time. The processing section 12 may therefore assign one of the apparatuses 20 and 40 as a collection source of the data block x1. For example, the processing section 12 assigns the apparatus 20 as the collection source of the data block x1.

Here, when there are N collection source apparatus candidates (N is an integer of 2 or more) for a certain data block, the processing section 12 may set the number n of assigned collection source apparatuses such that $1 \leq n \leq N-1$ (n may be set in advance by the user).

Secondly, only the apparatus 30 is present in the area R2 in the time frame t1. Hence, the data block y1 corresponding to the set of the time frame t1 and the area R2 is unique data retained by only the apparatus 30. The processing section 12 assigns the apparatus 30 as a collection source of the data block y1.

Thirdly, the apparatuses 20 and 40 are present in the area R1 in the time frame t2. The data block x2 corresponding to the set of the time frame t2 and the area R1 is retained by both of the apparatuses 20 and 40. It suffices to collect the data block x2 from one of the apparatuses 20 and 40. At this point in time, the cost for the apparatus 20 is 1, and the cost for the apparatus 40 is 0. The processing section 12 therefore assigns the apparatus 40 as a collection source of the data block x2.

Fourthly, only the apparatus 30 is present in the area R2 in the time frame t2. The data block y2 corresponding to the set of the time frame t2 and the area R2 is unique data retained by only the apparatus 30. The processing section 12 assigns the apparatus 30 as a collection source of the data block y2.

Fifthly, the apparatuses 20 and 40 are present in the area R1 in the time frame t3. The data block x3 corresponding to the set of the time frame t3 and the area R1 is retained by both of the apparatuses 20 and 40. It suffices to collect the data block x3 from one of the apparatuses 20 and 40. At this point in time, the costs for the apparatuses 20 and 40 are both 1. The processing section 12 may therefore assign either of the apparatuses 20 and 40 as a collection source of the data block x3. For example, the processing section 12 assigns the apparatus 20 as a collection source of the data block x3.

Sixthly, only the apparatus 30 is present in the area R2 in the time frame t3. The data block y3 corresponding to the set of the time frame t3 and the area R2 is unique data retained by only the apparatus 30. The processing section 12 assigns the apparatus 30 as a collection source of the data block y3.

Seventhly, the apparatuses 20 and 40 are present in the area R1 in the time frame t4. The data block x4 corresponding to the set of the time frame t4 and the area R1 is retained by both of the apparatuses 20 and 40. It suffices to collect the data block x4 from one of the apparatuses 20 and 40. At this point in time, the cost for the apparatus 20 is 2, and the cost for the apparatus 40 is 1. The processing section 12 therefore assigns the apparatus 40 as a collection source of the data block x4.

Eighthly, only the apparatus 30 is present in the area R2 in the time frame t4. The data block y4 corresponding to the set of the time frame t4 and the area R2 is unique data retained by only the apparatus 30. The processing section 12 assigns the apparatus 30 as a collection source of the data block y4.

Ninthly, only the apparatus 20 is present in the area R1 in the time frame t5. The data block x5 corresponding to the set of the time frame t5 and the area R1 is unique data retained by only the apparatus 20. The processing section 12 assigns the apparatus 20 as a collection source of the data block x5.

Tenthly, the apparatuses 30 and 40 are present in the area R2 in the time frame t5. The data block y5 corresponding to the set of the time frame t5 and the area R2 is retained by both of the apparatuses 30 and 40. It suffices to collect the data block y5 from one of the apparatuses 30 and 40. At this point in time, the cost for the apparatus 30 is 4, and the cost for the apparatus 40 is 2. The processing section 12 therefore assigns the apparatus 40 as a collection source of the data block y5.

Eleventhly, only the apparatus 20 is present in the area R1 in the time frame t6. The data block x6 corresponding to the set of the time frame t6 and the area R1 is unique data retained by only the apparatus 20. The processing section 12 assigns the apparatus 20 as a collection source of the data block x6.

Twelfthly, the apparatuses 30 and 40 are present in the area R2 in the time frame t6. The data block y6 corresponding to the set of the time frame t6 and the area R2 is retained by both of the apparatuses 30 and 40. It suffices to collect the data block y6 from one of the apparatuses 30 and 40. At this point in time, the cost for the apparatus 30 is 4, and the cost for the apparatus 40 is 3. The processing section 12 therefore assigns the apparatus 40 as a collection source of the data block y6.

Thus, the apparatus 20 is assigned as a collection source of the data blocks x1, x3, x5, and x6. Hence, the cost C1 for the apparatus 20 is 4. The apparatus 30 is assigned as a collection source of the data blocks y1, y2, y3, and y4. The cost C2 for the apparatus 30 is 4. The apparatus 40 is assigned as a collection source of the data blocks x2, x4, y5, and y6. The cost C3 for the apparatus 40 is 4.

For each set of a time frame and an area, the processing section 12 collects a data block from an apparatus assigned as a collection source. For example, the processing section 12 requests the apparatus 20 to transmit the data blocks x1, x3, x5, and x6, and receives the data blocks x1, x3, x5, and x6 transmitted by the apparatus 20. In addition, the processing section 12 requests the apparatus 30 to transmit the data blocks y1, y2, y3, and y4, and receives the data blocks y1, y2, y3, and y4 transmitted by the apparatus 30. Further, the processing section 12 requests the apparatus 40 to transmit the data blocks x2, x4, y5, and y6, and receives the data blocks x2, x4, y5, and y6 transmitted by the apparatus 40.

As described earlier, the processing section 12 may interpolate missing data blocks of the respective apparatuses by a given algorithm based on the collected data blocks. For example, the processing section 12 interpolates the data blocks in the time frames t2 and t4 in the apparatus 20 based on the data blocks x2 and x4 collected from the apparatus 40. In addition, the processing section 12 interpolates the data blocks in the time frames t5 and t6 in the apparatus 30 based on the data blocks y5 and y6 collected from the apparatus 40. Further, the processing section 12 interpolates the data blocks in the time frames t1 and t3 in the apparatus 40 based on the data blocks x1 and x3 collected from the apparatus 20. Thus, the processing section 12 obtains the data D1, D2, and D3, and becomes able to analyze the data D1, D2, and D3.

According to the data collecting device 10, a data obtainment target period and a plurality of areas are identified based on a request from the user. A plurality of apparatuses present in each area in each time frame as a data obtainment unit in the period are extracted. From among the extracted plurality of apparatuses, based on the given condition, for each set of a time frame and an area, an apparatus as a data block collection source corresponding to the set of the time frame and the area is assigned. A data block is collected from the apparatus assigned as the collection source for each set of the time frame and the area.

It is thereby possible to avoid collection of duplicate information.

Here, in a case where there is a possibility that at least a part of apparatuses as data collection sources are moved as in the example of the first embodiment, there is a possibility that a data block in a certain area in a certain time frame may not be collected when collection source apparatuses are fixedly excluded based on identification numbers or the like. In the case of the above-described example, when data collection from the apparatus 20 for the time frames t5 and t6 is not made, and data collection from the apparatus 30 for the time frames t1 to t4 is not made, it is difficult to collect the data blocks retained by only the apparatus 20 or only the apparatus 30, and it is also difficult to perform subsequent interpolation.

In the case where there is a possibility that at least a part of data collection source apparatuses are moved, for example, all of the data D1, D2, and D3 may be collected from the apparatuses 20, 30, and 40 present in the target areas R1 and R2 in the target period T1. However, as described earlier, the data D1, D2, and D3 has duplicate data blocks, and it is therefore inefficient to collect all of the data D1, D2, and D3 from the apparatuses 20, 30, and 40.

Accordingly, the data collecting device 10 may avoid collecting duplicate information by assigning, for each set of a time frame as a data obtainment unit and an area, an apparatus as a collection source of a data block corresponding to the set. Avoiding collecting duplicate information contributes to shortening of a time needed for data collection and a reduction in a data transmission load on each apparatus, the data transmission load being involved in the data collection.

In addition, as described above, the data collecting device 10 may level the cost of each apparatus, and assign apparatuses as data block collection sources. By using a time of data collection from each apparatus as the cost, it is possible to level the time of data collection from each apparatus, and shorten a time of data collection as a whole. As a result, analysis of the collected data or the like, for example, may be started promptly. It is also possible to level a fuel consumption (or a power consumption) involved in data transmission by each apparatus by using the fuel consumption (or the power consumption) of each apparatus as the cost. Further, the data collecting device 10 may assign apparatuses as data block collection sources so as to level a remaining fuel (or a remaining battery capacity) of each apparatus.

Further, the data collecting device 10 may calculate cost (unit cost) per data block to be collected according to a load on each apparatus or the like, and assign apparatuses as data block collection sources so as to level the cost of each apparatus based on the calculated unit cost of each apparatus.

In the following, functions of the data collecting device 10 will be described in more detail by illustrating a more specific data collecting system.

Second Embodiment

A second embodiment will next be described.

FIG. 2 is a diagram illustrating an example of a data collecting system according to the second embodiment.

The data collecting system according to the second embodiment includes a server 100 and edges 200, 300, 400, . . . . The server 100 is coupled to a network 50. The network 50 is, for example, a wide area network (WAN). The network 50 is coupled with base stations 51, 52, . . . . The base stations 51, 52, . . . wirelessly communicate with edges present in areas to which the respective base stations belong. The server 100 and each edge may communicate with each other via the network 50 and the base station in one of the areas.

The server 100 is a server computer that collects data obtained by the edges 200, 300, 400, . . . from the edges 200, 300, 400, . . . , and analyzes the data. The server 100 identifies a period and an area as a target of data collection according to an analysis request of the user, and collects data related to the identified period and the identified area from the edges 200, 300, 400, . . . . In the second embodiment, data on amounts of rainfall will be illustrated as data obtained by the edges 200, 300, 400, . . . .

The server 100 is an example of the data collecting device 10 according to the first embodiment.

The edges 200, 300, 400, . . . are moving bodies such as vehicles or the like or devices mounted on moving bodies. Each of the edges 200, 300, 400, . . . includes a raindrop sensor, and obtains data on an amount of rainfall by using the raindrop sensor. Each of the edges 200, 300, 400, . . . has a wireless communicating function, and communicates with a base station in an area in which the edge itself is present wirelessly. Each of the edges 200, 300, 400, . . . transmits the obtained data on the amount of rainfall to the server 100 in response to a request from the server 100.

The edges 200, 300, 400, . . . are an example of the apparatuses 20, 30, and 40 according to the first embodiment.

Figure 3:
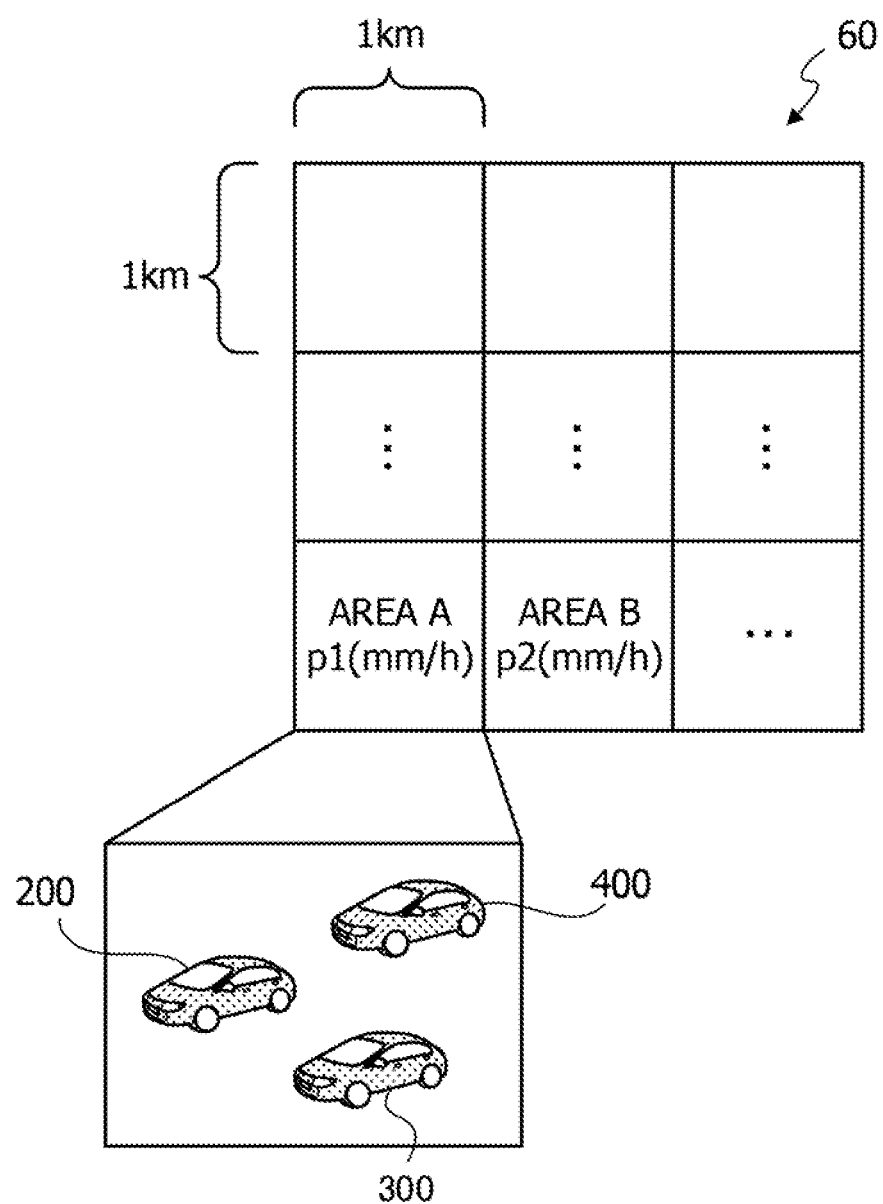
FIG. 3 is a diagram illustrating an example of areas.

FIG. 3 is a diagram illustrating an example of areas.

A region 60 is an analysis target region specified by the analysis request of the user. Areas included in the region 60 are determined in advance. For example, the server 100 sets one of divided square divisions each having one side of 1 km within the region 60 as one data collection target area. However, 1 km is an example, and the length may be another length. The region 60 includes a plurality of areas. The plurality of areas are identified as an "area A," an "area B," . . . , for example. FIG. 3 illustrates an example in which the edges 200, 300, and 400 are present in the area A in a certain time frame.

As an example, the server 100 analyzes an amount of rainfall per unit time (for example, one hour) in each area included in the region 60.

Figure 4:
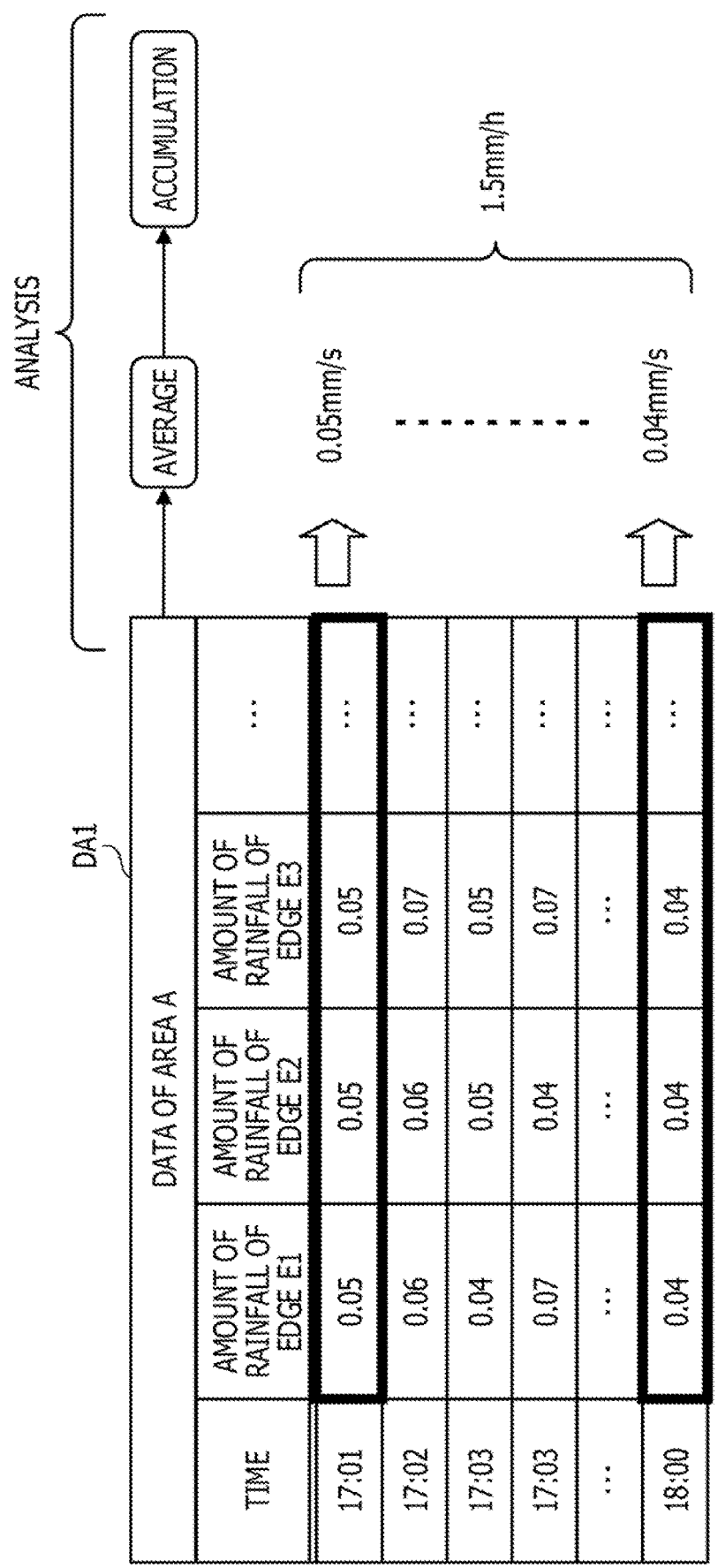
FIG. 4 is a diagram illustrating an example of analysis of an amount of rainfall in an area.

FIG. 4 is a diagram illustrating an example of analysis of an amount of rainfall in an area.

The server 100, for example, analyzes an amount of rainfall per one hour (unit is mm/h) in a period of 17:01 to 18:00 in the area A as follows.

The server 100 divides the period of one hour into time frames of a unit time (for example, one minute), and obtains amounts of rainfall (unit is mm/s) measured by edges present in the area A in each time frame. At this time, as will be described later, the server 100 collects data on an amount of rainfall from at least one edge present in the area A in each time frame, and thereby interpolates an amount of rainfall of another edge in the time frame.

For example, as a result of the interpolation, the server 100 obtains data DA1 of the area A. The data DA1 indicates amounts of rainfall of the respective edges present in the area A in time frames at intervals of one minute in the period of 17:01 to 18:00.

The server 100 obtains an average of the amounts of rainfall of the respective edges present in the area A in each time frame. Then, the server 100 obtains an amount of rainfall per hour in the period of 17:01 to 18:00 in the area A by accumulating the averages of the amounts of rainfall obtained in the respective time frames. The server 100 may obtain an amount of rainfall per hour also for other areas similarly to the area A.

Figure 5:
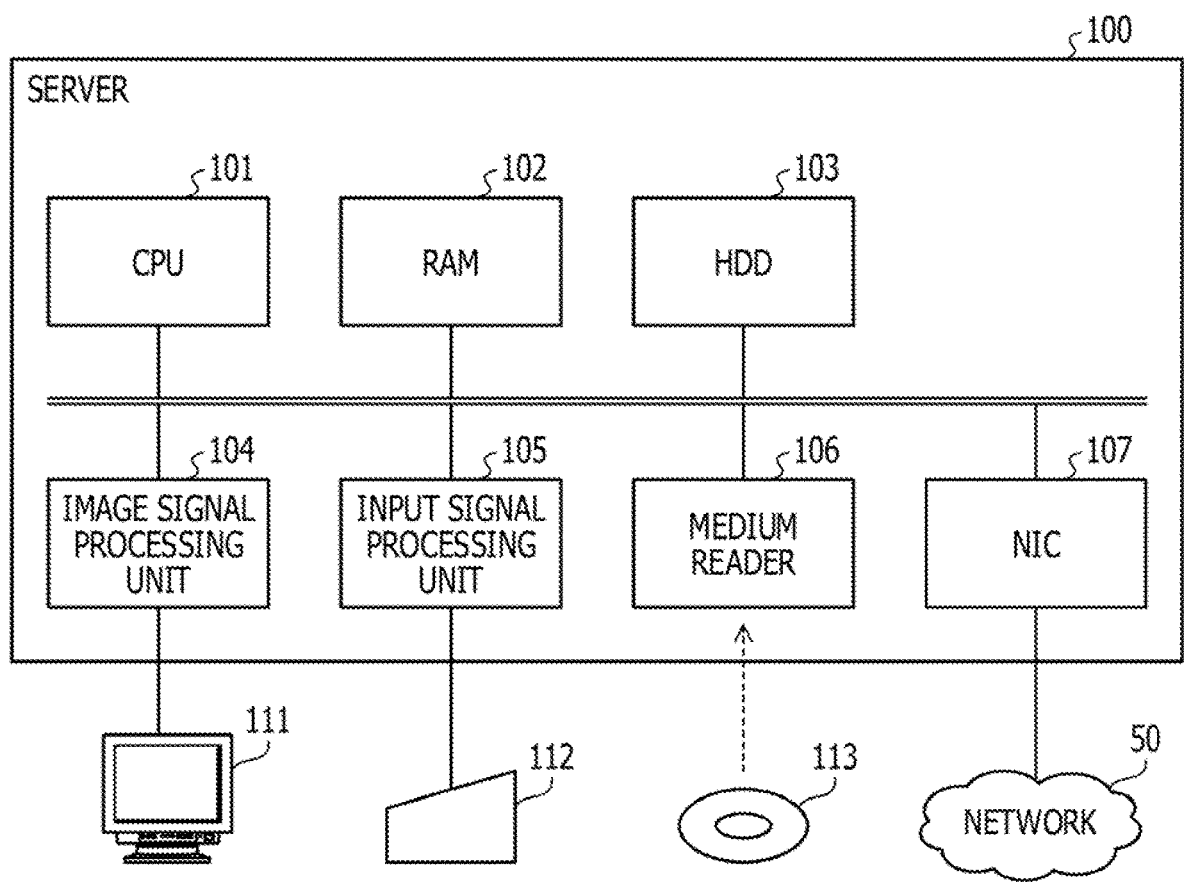
FIG. 5 is a block diagram illustrating an example of hardware of a server.

FIG. 5 is a block diagram illustrating an example of hardware of a server.

The server 100 includes a CPU 101, a RAM 102, an HDD 103, an image signal processing unit 104, an input signal processing unit 105, a medium reader 106, and a network interface card (NIC) 107. Incidentally, the CPU 101 corresponds to the processing section 12 in the first embodiment. The RAM 102 or the HDD 103 corresponds to the storage section 11 in the first embodiment.

The CPU 101 is a processor that executes instructions of a program. The CPU 101 loads at least a part of a program and data stored on the HDD 103 into the RAM 102, and executes the program. Incidentally, the CPU 101 may include a plurality of processor cores. In addition, the server 100 may include a plurality of processors. Processing to be described in the following may be performed in parallel by using the plurality of processors or processor cores. In addition, a set of the plurality of processors may be referred to as a "multiprocessor" or simply as a "processor."

The RAM 102 is a volatile semiconductor memory that temporarily stores the program executed by the CPU 101 and data used by the CPU 101 for operation. Incidentally, the server 100 may include another kind of memory other than the RAM, and may include a plurality of memories.

The HDD 103 is a nonvolatile storage device that stores programs of software such as an operating system (OS), middleware, application software, and the like and data. Incidentally, the server 100 may include another kind of storage device such as a flash memory, a solid state drive (SSD), or the like, and may include a plurality of nonvolatile storage devices.

The image signal processing unit 104 outputs an image to a display 111 coupled to the server 100 according to an instruction from the CPU 101. Useable as the display 111 are arbitrary kinds of displays such as a cathode ray tube (CRT) display, a liquid crystal display (LCD), a plasma display, an organic electro-luminescence (OEL) display, and the like.

The input signal processing unit 105 obtains an input signal from an input device 112 coupled to the server 100, and outputs the input signal to the CPU 101. Useable as the input device 112 are pointing devices such as a mouse, a touch panel, a touch pad, a trackball, and the like, a keyboard, a remote controller, a button switch, and the like. In addition, a plurality of kinds of input devices may be coupled to the server 100.

The medium reader 106 is a reading device that reads a program and data recorded on a recording medium 113. Useable as the recording medium 113 are, for example, a magnetic disk, an optical disk, a magneto-optical disk (MO), a semiconductor memory, and the like. The magnetic disk includes a flexible disk (FD) and an HDD. The optical disk includes a compact disc (CD) and a digital versatile disc (DVD).

The medium reader 106, for example, copies the program and the data read from the recording medium 113 to another recording medium such as the RAM 102, the HDD 103, or the like. The read program is, for example, executed by the CPU 101. Incidentally, the recording medium 113 may be a portable recording medium, and may be used to distribute the program and the data. In addition, the recording medium 113 and the HDD 103 may be referred to as a computer readable recording medium.

The NIC 107 is an interface that is coupled to the network 50 and communicates with another computer via the network 50. The NIC 107 is, for example, coupled by a cable to a communicating device such as a switch, a router, or the like belonging to the network 50.

Figure 6:
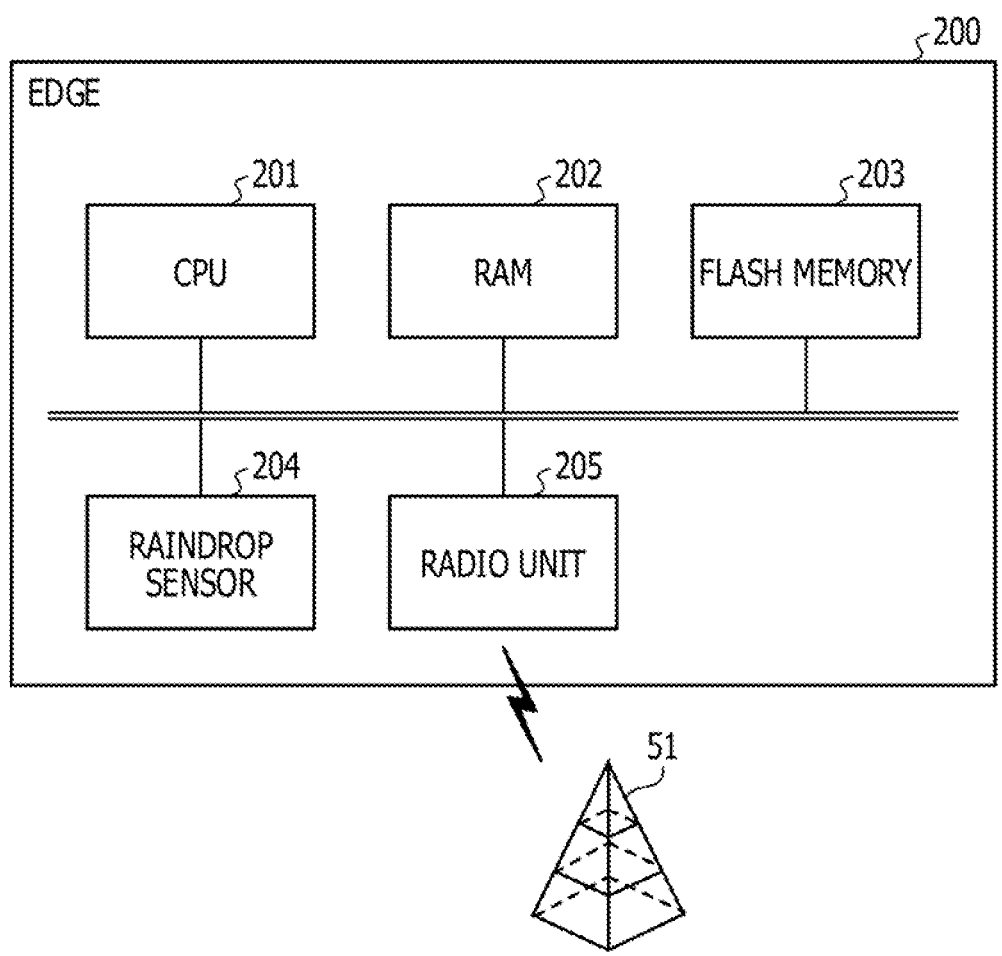
FIG. 6 is a block diagram illustrating an example of hardware of an edge.

FIG. 6 is a block diagram illustrating an example of hardware of an edge.

The edge 200 includes a CPU 201, a RAM 202, a flash memory 203, a raindrop sensor 204, and a radio unit 205.

The CPU 201 is a processor that executes instructions of a program. The CPU 201 loads at least a part of a program and data stored in the flash memory 203 into the RAM 202, and executes the program. Incidentally, the CPU 201 may include a plurality of processor cores. In addition, the edge 200 may include a plurality of processors.

The RAM 202 is volatile semiconductor memory that temporarily stores the program executed by the CPU 201 and data used by the CPU 201 for operation.

The flash memory 203 is a nonvolatile storage device that stores a program of software such as firmware or the like and data.

The raindrop sensor 204 is a sensor that detects an amount of rainfall in the surroundings of the edge 200. The raindrop sensor 204 stores data on the detected amount of rainfall in the RAM 202 or the flash memory 203.

The radio unit 205 is a wireless communication interface that may be coupled to the base stations 51, 52, . . . wirelessly. The radio unit 205 communicates with the server 100 via a base station covering an area in which the edge 200 is present.

Incidentally, in a case where the edge 200 itself moves, the edge 200 includes a moving mechanism such as a motor, an engine, or the like, which is not illustrated in FIG. 6.

The edges 300, 400, . . . are also implemented by hardware similar to that of the edge 200.

Figure 7:
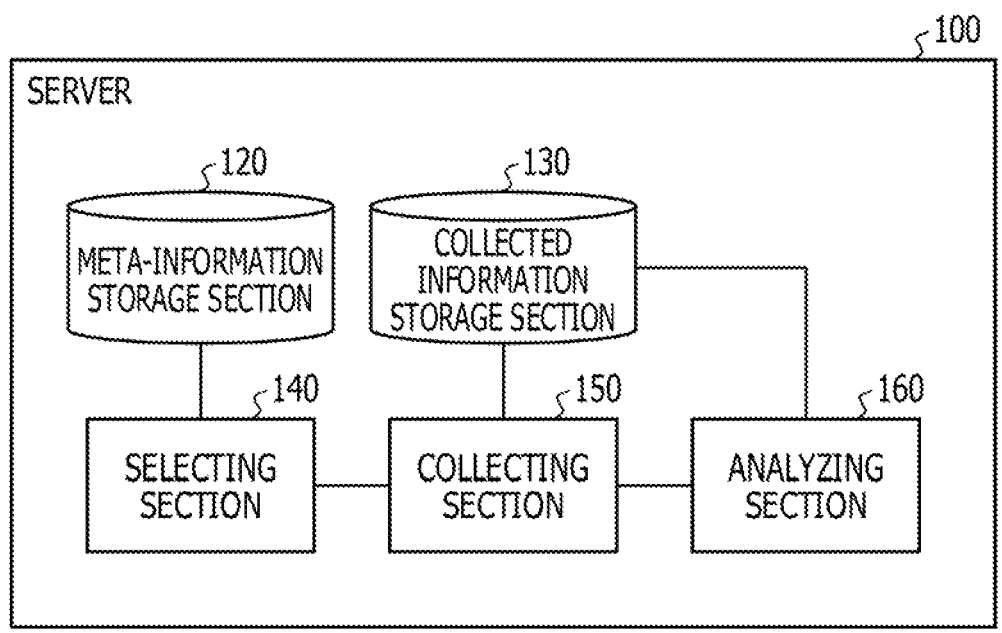
FIG. 7 is a block diagram illustrating an example of functions of a server.

FIG. 7 is a block diagram illustrating an example of functions of a server.

The server 100 includes a meta-information storage section 120, a collected information storage section 130, a selecting section 140, a collecting section 150, and an analyzing section 160. The meta-information storage section 120 and the collected information storage section 130 are implemented by a storage area of the RAM 102 or the HDD 103. The selecting section 140, the collecting section 150, and the analyzing section 160 are implemented when the CPU 101 executes the program stored in the RAM 102.

The meta-information storage section 120 stores meta-information. The meta-information includes a history of positional information of each edge and a history of load information of each edge. The positional information and the load information of each edge are periodically obtained from each edge. The load information is, for example, a CPU usage rate of each edge or the like. The meta-information may be obtained by the collecting section 150 and stored in the meta-information storage section 120.

The collected information storage section 130 stores data on the amount of rainfall measured by the raindrop sensor of each edge. The data on the amount of rainfall is collected by the collecting section 150 and stored in the collected information storage section 130 in response to an analysis request of the user.

The selecting section 140 receives an input by the user of a rainfall amount analysis request. The selecting section 140 identifies a rainfall amount data obtainment target period and a plurality of rainfall amount data obtainment target areas based on the analysis request. The selecting section 140 extracts a plurality of edges present in each of the identified areas in each time frame as a data obtainment unit (for example, time frames of one minute) of the rainfall amount data obtainment target period. From among the extracted plurality of edges, based on the given condition, for each set of a time frame in the rainfall amount data obtainment target period and an area, the selecting section 140 assigns an edge as a collection source of a data block corresponding to the set of the time frame and the area.

The collecting section 150 collects data on an amount of rainfall from each edge based on a result of the assignment by the selecting section 140, and stores the data in the collected information storage section 130. The collecting section 150 collects a data block corresponding to each set of a time frame and an area from the edge assigned as a collection source for the set of the time frame and the area by the selecting section 140. The collecting section 150 does not collect the data block corresponding to the set of the time frame and the area from an edge not assigned as the collection source for the set of the time frame and the area in question. For example, the collecting section 150 collects the data block corresponding to each set of the time frame and the area from only the edge assigned as the collection source for the set of the time frame and the area by the selecting section 140.

The analyzing section 160 analyzes an amount of rainfall in a given time unit (for example, a unit of one hour) in each area, as requested by the analysis request of the user, based on data on amounts of rainfall, the data being stored in the collected information storage section 130. The analyzing section 160 outputs an analysis result to the display 111, and thereby presents the analysis result to the user. Alternatively, the analyzing section 160 may present the analysis result to the user by transmitting the analysis result to another computer via the network 50 or the like, and making the other computer display the analysis result.

Figure 8:
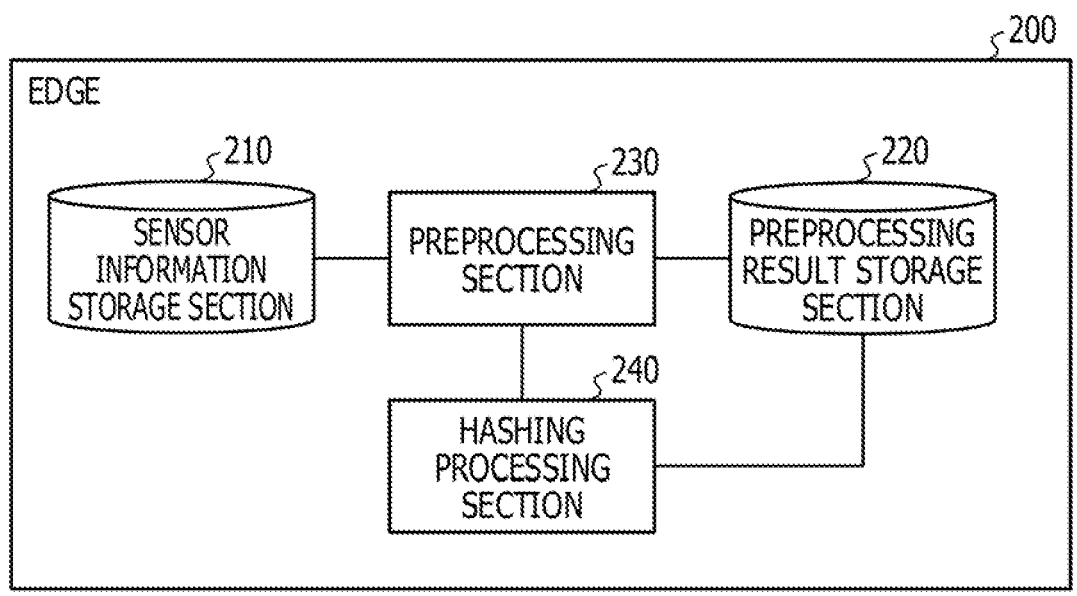
FIG. 8 is a block diagram illustrating an example of functions of an edge.

FIG. 8 is a block diagram illustrating an example of functions of an edge.

The edge 200 includes a sensor information storage section 210, a preprocessing result storage section 220, a preprocessing section 230, and a hashing processing section 240. The sensor information storage section 210 and the preprocessing result storage section 220 are implemented by a storage area of the RAM 202 or the flash memory 203. The preprocessing section 230 and the hashing processing section 240 are implemented when the CPU 201 executes the program stored in the RAM 202.

The sensor information storage section 210 stores data (sensor information) on an amount of rainfall obtained by the raindrop sensor 204. The data on the amount of rainfall obtained by the raindrop sensor 204 is, for example, an amount of rainfall per second (mm/s).

The preprocessing result storage section 220 stores a result of preprocessing of the data on the amount of rainfall stored in the sensor information storage section 210 by the preprocessing section 230 (preprocessing result). In the preprocessing, sensor information is set to be average amounts of rainfall (mm/s) at intervals of one minute, and is further rounded so as to satisfy a given accuracy.

In response to a request from the server 100, the preprocessing section 230 performs preprocessing on the sensor information stored in the sensor information storage section 210. The request from the server 100 includes a specification of a time frame and an area to be transmitted (specification using a hash value, as will be described later) in the preprocessing result. The preprocessing section 230 performs preprocessing on the sensor information corresponding to the time frame and the area according to the request from the server 100, and transmits the preprocessing result to the server 100.

In response to the request from the server 100, the hashing processing section 240 hashes a part of the preprocessing result stored in the preprocessing result storage section 220, and transmits a result of the hashing to the server 100.

The edges 300, 400, . . . also have similar functions to those of the edge 200.

Figure 9:
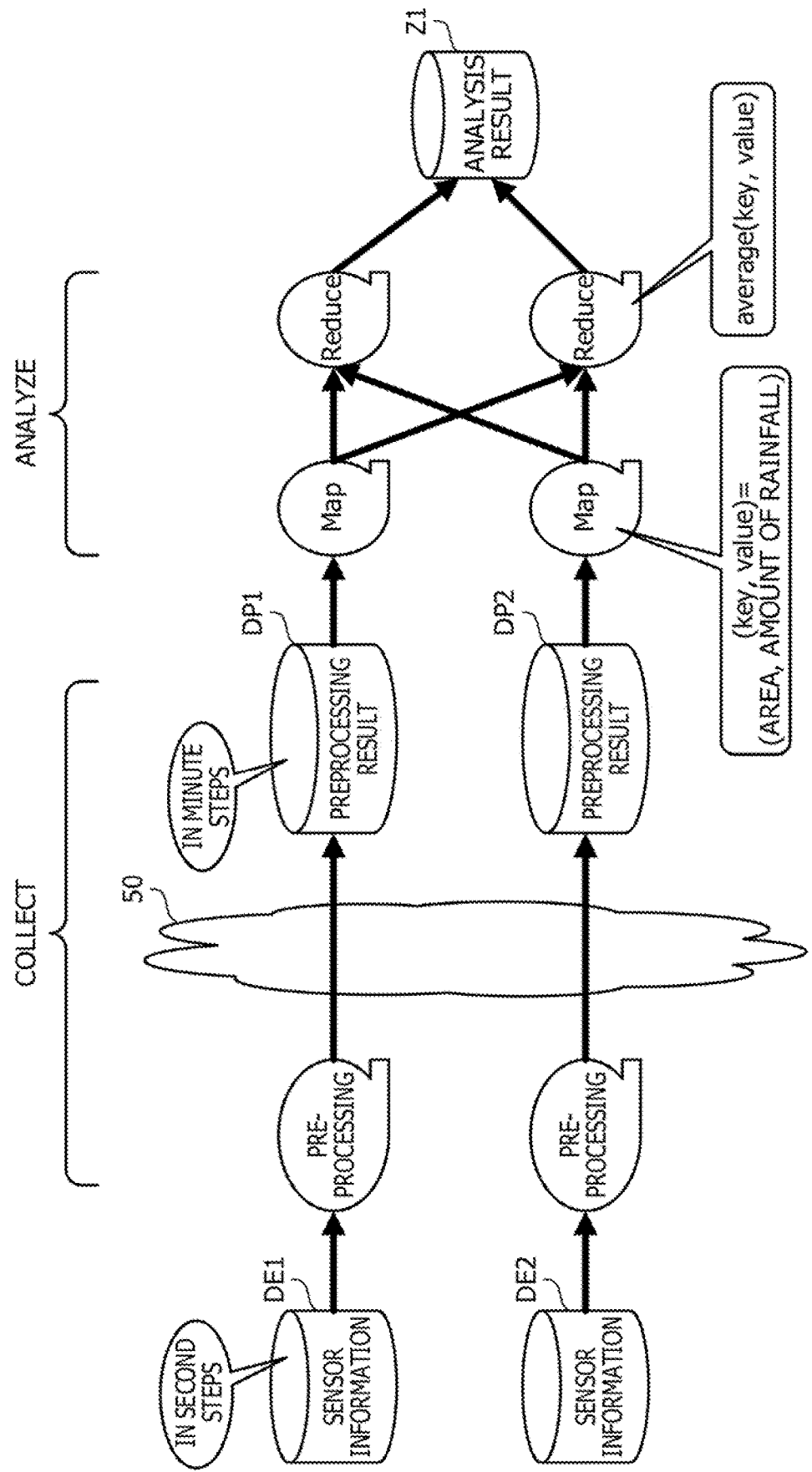
FIG. 9 is a diagram illustrating an example of a flow of data collection and analysis.

FIG. 9 is a diagram illustrating an example of a flow of data collection and analysis.

Sensor information DE1 and DE2 is information regarding amounts of rainfall (in second steps) obtained by an edge (for example, each of a first edge and a second edge) by the raindrop sensor.

The server 100 collects data from each edge as follows.

The first edge generates a preprocessing result DP1 by preprocessing the sensor information DE1 in response to a request of the server 100. As described earlier, the preprocessing result DP1 is obtained by obtaining averages of amounts of rainfall of the sensor information DE1 in minute steps, and rounding the averages. The first edge transmits the preprocessing result DP1 to the server 100 via the network 50.

The second edge generates a preprocessing result DP2 by preprocessing the sensor information DE2 in response to a request of the server 100. The second edge transmits the preprocessing result DP2 to the server 100 via the network 50.

Then, the server 100 interpolates uncollected data of each edge based on data collected from each edge. The server 100 performs the analysis illustrated in FIG. 4 by using a framework referred to as MapReduce, for example, based on a result of the interpolation. The server 100 performs distributed processing of the collected data in cooperation with a plurality of nodes performing Map processing and Reduce processing in MapReduce. For example, in the Map processing, a node performing the Map processing sets an area as a key and sets an amount of rainfall as a value for each time frame (for example, intervals of one minute) in the preprocessing results DP1 and DP2, and integrates data of a same key into a node performing the Reduce processing. The node performing the Reduce processing obtains an average (average (key, value)) of the value (amount of rainfall) of the key (area) in question in each time frame. Further, the server 100 obtains an amount of rainfall per hour (mm/h) in the area in question by accumulating average amounts of rainfall in respective time frames over one hour for the area in question.

Figure 10:
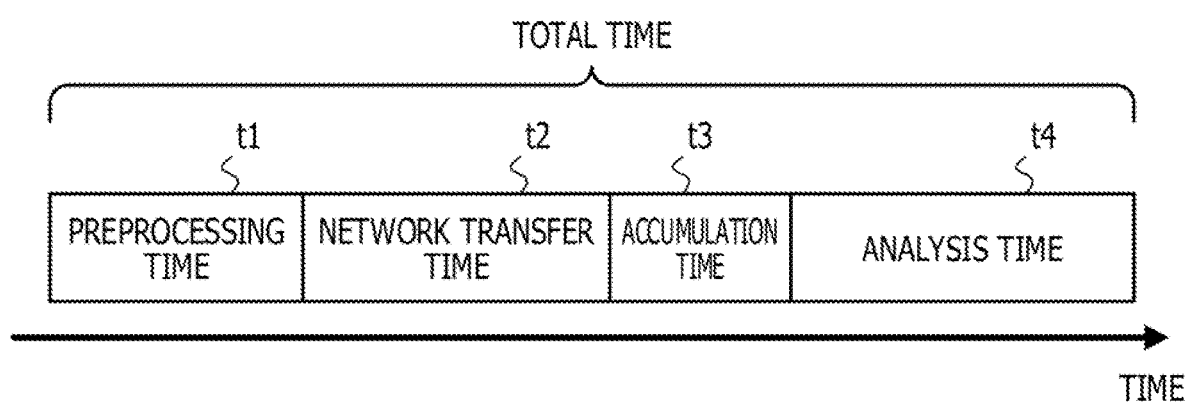
FIG. 10 is a diagram illustrating an example of a total time of data collection and analysis.

FIG. 10 is a diagram illustrating an example of a total time of data collection and analysis.

A time taken to complete a series of flows from data collection to analysis as illustrated in FIG. 9 is divided into a preprocessing time t1, a network transfer time t2, an accumulation time t3, and an analysis time t4.

The preprocessing time t1 is a time needed for preprocessing by each edge.

The network transfer time t2 is a time needed to transmit a preprocessing result from each edge to the server 100.

The accumulation time t3 is a time needed for the server 100 to accumulate the preprocessing result collected from each edge.

The analysis time t4 is a time needed for the server 100 to analyze the data collected from each edge.

When all of data in a target period, the data being retained by each edge, is collected from each edge present in a target area with the user-specified period and region as a reference, there is a possibility that much time is taken as the preprocessing time t1 and the network transfer time t2, and that completion of analysis is therefore delayed. Accordingly, the server 100 excludes, from data collection, data (referred to as similar data) of another edge having a value approximate to the value of data retained by a certain edge, and interpolates the similar data of the other edge on the server 100 side.

Figure 11:
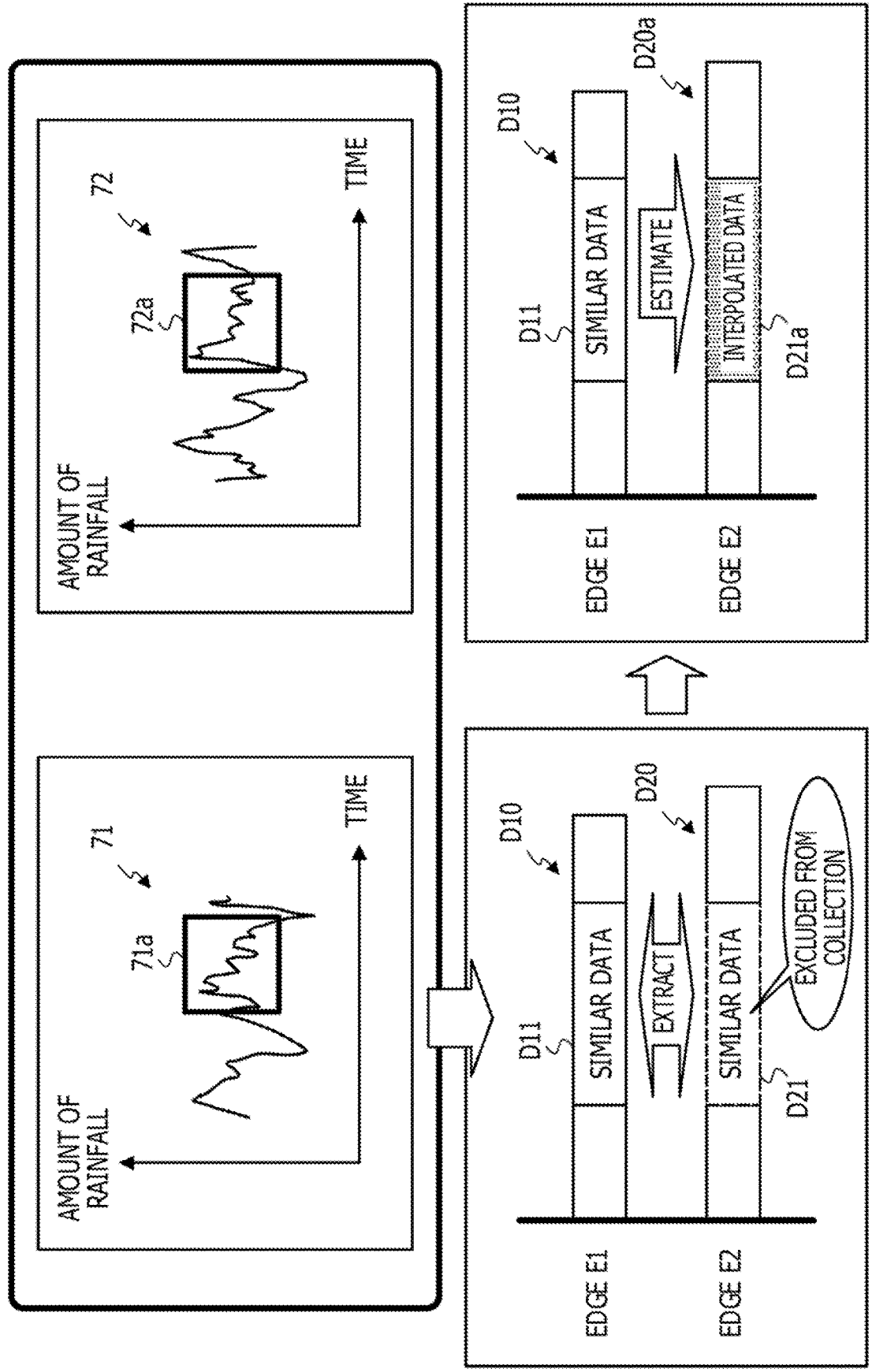
FIG. 11 is a diagram illustrating an example of exclusion and interpolation of similar data.

FIG. 11 is a diagram illustrating an example of exclusion and interpolation of similar data.

A graph 71 illustrates data (preprocessing result) on an amount of rainfall obtained by the first edge (referred to as an edge E1). A graph 72 illustrates data (preprocessing result) on an amount of rainfall obtained by the second edge (referred to as an edge E2).

A range 71a of the graph 71 and a range 72a of the graph 72 represent data in a same time range in a data collection target period. In a case where the edges E1 and E2 are both present in a same area in the time range indicated by the ranges 71a and 72a, there is correlation (similarity) between two pieces of data in the ranges 71a and 72a.

Accordingly, the server 100 extracts similar data D11 and D21 similar to each other in data D10 retained by the edge E1 and data D20 retained by the edge E2. For example, the server 100 determines based on a history of areas in which the respective edges are present in the respective time frames that a plurality of edges present in a same area in a same time frame mutually have similar data for a set of the time frame and the area in question. The server 100, for example, sets only the edge E1 of the edges E1 and E2 as a collection source of the similar data D11, and does not set the edge E2 as a collection source of the similar data D21.

When the server 100 collects the similar data D11 from the edge E1, the server 100 may estimate and generate interpolation data D21a corresponding to the similar data D21 based on the similar data D11 without collecting the similar data D21 from the edge E2. Thus, the server 100 performs data collection without collecting the similar data D21 in the edge E2, and obtains data D20a as a preprocessing result in the edge E2 by interpolating the uncollected similar data by using the interpolation data D21a. The server 100 performs analysis processing based on the data D10 collected from the edge E1 and the data D20a of the edge E2.

FIG. 12 is a diagram illustrating an example of edge history tables.

Edge history tables 121, 122, 123, . . . are stored in the meta-information storage section 120. The edge history tables 121, 122, 123, . . . are history information (meta-information) of respective edges. For example, the edge history tables 121, 122, 123, . . . are generated for the respective edges. In the following, description will be made by illustrating the edge history table 121. However, the edge history tables 122, 123, . . . also have a similar data structure.

The edge history table 121 includes items of an edge identifier (ID), time, positional information, and load information. The identification information (edge ID) of the edge is registered as the item of an edge ID. A time is registered as the item of time. An area in which the edge is present at the time in question is registered as the item of positional information. The CPU usage rate of the edge at the time in question is registered as the item of load information.

For example, a record is registered in the edge history table 121, the record having "E1" as an edge ID, "17:01" as time, "A" as positional information, and "70%" as load information. This record indicates that the edge (edge E1) identified by the edge ID "E1" is present in the area A and has a CPU usage rate of 70% at 17:01. A latest record in the edge history table 121, for example, indicates a latest presence position and a load of the edge in question.

FIG. 13 is a diagram u rating an example of a hash value table.

A hash value table 121a is generated by the selecting section 140 based on the edge history tables 121, 122, 123, . . . , and is stored in the meta-information storage section 120. Registered in the hash value table 121a are hash values for identifying edges present in a same area in a same time frame.

The hash value table 121a includes items of a time slot ID, the edge E1, the edge E2, the edge E3, . . . . Identification information (time slot ID) for distinguishing a time frame in the data collection target period is registered as the item of a time slot ID. For example, in a case where the data collection target period is divided into time frames at intervals of one minute, such as 17:01, 17:02, . . . , time slot IDs "1," "2," . . . are given to 17:01, 17:02, . . . , respectively. Hash values of the respective edges E1, E2, E3, . . . , the hash values corresponding to the time slot IDs in question, are registered as the respective items of the edges E1, E2, E3, . . . .

Here, a hash value is obtained with a time and an area as input to a hash function. The hash function h is expressed as h=h(time, area).

The selecting section 140 obtains an exclusive disjunction of hash values expressed by binary numbers between edges. When a sum of bits in a result of the exclusive disjunction is 0, the selecting section 140 determines that the two edges mutually retain similar data at a time frame in question. Otherwise, the two edges do not mutually retain similar data at the time frame in question. When the sum of the bits in the result of the exclusive disjunction is not 0, the selecting section 140 determines that the two edges do not mutually retain similar data at the time frame in question.

FIG. 14 is a diagram illustrating an example of sensor data.

Sensor data 211 is stored in the sensor information storage section 210. The sensor data 211 includes items of time, positional information, and an amount of rainfall. A time in second steps is registered as the item of time. An area in which the edge 200 is present at the time in question is registered as the item of positional information. An amount of rainfall (mm/s) at the time in question is registered as the item of an amount of rainfall.

For example, a record is registered in the sensor data 211, the record having "17:01:01" as time, "A" as positional information, and "0.05" as an amount of rainfall. This record indicates that the edge 200 is present in the area A at 17:01:01 and that an amount of rainfall of 0.05 mm/s is measured by the raindrop sensor for the time in question.

FIG. 15 is a diagram illustrating an example of preprocessing result data.

Preprocessing result data 221 is generated by the preprocessing section 230 based on the sensor data 211, and is stored in the preprocessing result storage section 220. The preprocessing result data 221 includes items of time, positional information, and an amount of rainfall. A time in minute steps is registered as the item of time. An area in which the edge 200 is present at the time in question is registered as the item of positional information. An amount of rainfall (mm/s) at the time in question is registered as the item of an amount of rainfall.

For example, a record is registered in the preprocessing result data 221, the record having "17:01" as time, "A" as positional information, and "0.05" as an amount of rainfall. This record indicates that the edge 200 is present in the area A at 17:01 and that 0.05 mm/s is measured as an average amount of rainfall for one minute from 17:01:01 to 17:02:00.

Incidentally, when the preprocessing section 230 averages amounts of rainfall in a time frame in steps of one minute in preprocessing, there may be a plurality of areas in which a certain edge is present in steps of one second in the time frame in question in the sensor data 211. In this case, the amounts of rainfall may be averaged for each of the presence areas in the time frame in question, for example. Alternatively, an area in which the presence of the edge is detected a maximum number of times in the time frame in question may be regarded as the presence area of the edge in the time frame in question.

FIG. 16 is a diagram illustrating an example of collected data.

Collected data 131, 132, 133, . . . is stored in the collected information storage section 130. The collected data 131, 132, 133, . . . is collected information of respective edges. For example, the collected data 131, 132, 133, . . . is generated for the respective edges. In the following, description will be made by illustrating the collected data 131. However, the collected data 131, 132, 133, . . . also has a similar data structure.

The collected data 131 includes items of an edge ID, time, an area, and an amount of rainfall. An edge ID is registered as the item of an edge ID. A time is registered as the item of time. An area in which an edge indicated by the edge ID is present at the time in question is registered as the item of an area. An amount of rainfall (mm/s) at the time in question is registered as the item of an amount of rainfall.

For example, a record is registered in the collected data 131, the record having "E1" as an edge ID, "17:01" as time, "A" as an area, and "0.05" as an amount of rainfall. This record indicates that the edge E1 is present in the area A at 17:01 and that 0.05 mm/s is measured by the edge E1 as an average amount of rainfall for one minute from 17:01:01 to 17:02:00.

Here, the selecting section 140 distinguishes between similar data mutually retained by a plurality of edges and unique data retained by only an edge in question based on the hash value table 121a. Then, for each edge, a time of data collection from the edge according to the number of pieces of similar data to which the edge is assigned as a collection source is estimated based on a unit data size retained by the edge, actual measurement information regarding the data collection time, and present load information of the edge. The selecting section 140 adjusts the number of pieces of similar data assigned to each edge so as to level data collection times between edges.

As described with reference to FIG. 10, a data collection time is a sum of the preprocessing time t1 and the network transfer time t2. Accordingly, the selecting section 140 determines one unit of the preprocessing time and one unit of the network transfer time for each edge as follows.

Figure 17:
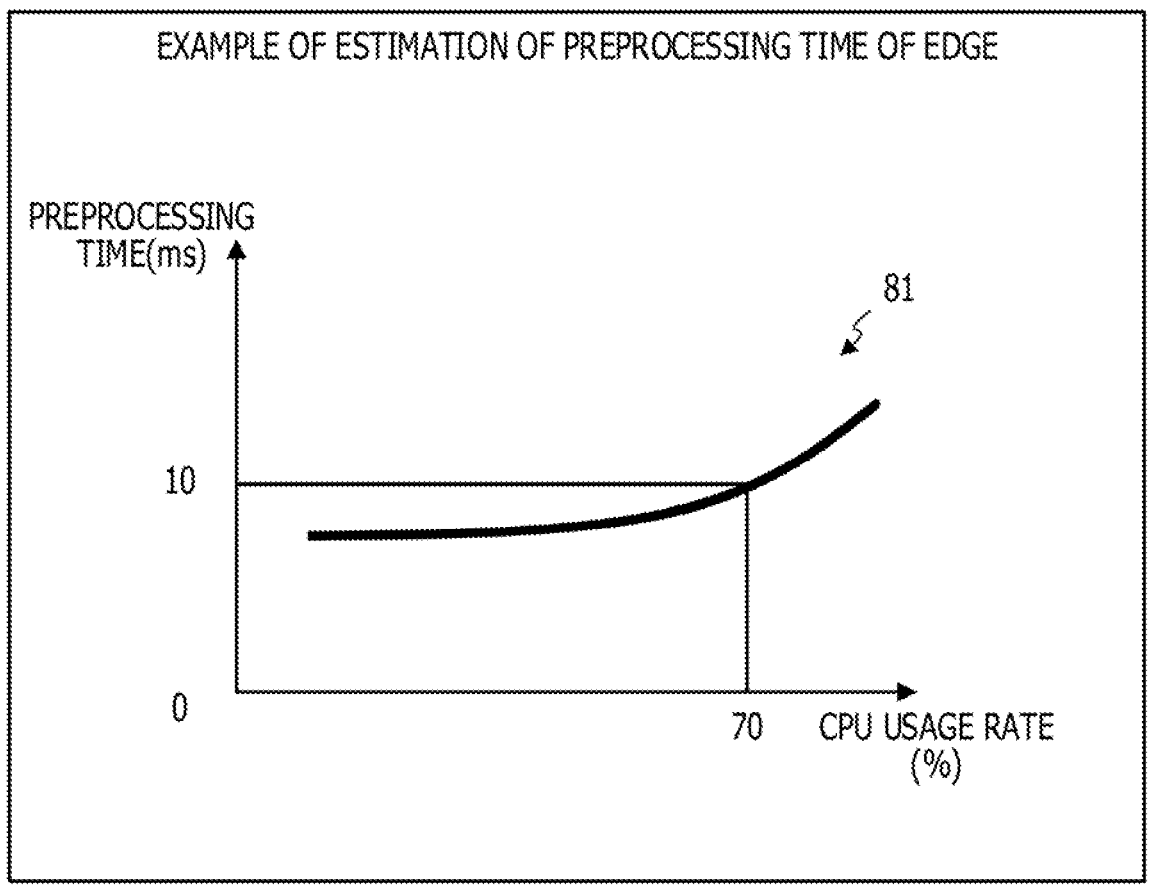
FIG. 17 is a diagram illustrating an example of estimation of a preprocessing time of an edge.

FIG. 17 is a diagram illustrating an example of estimation of a preprocessing time of an edge.

The selecting section 140 collects, from each edge in advance, statistical information regarding the preprocessing time corresponding to the CPU usage rate of the edge per unit block of a preprocessing target. The size of the unit block of the preprocessing target is, for example, a size for one minute of data on an amount of rainfall in steps of one second. Then, at a time of data collection, the selecting section 140 estimates the preprocessing time of the edge in question from the present CPU usage rate of the edge in question. For example, the selecting section 140 generates, for each edge in advance, information indicating relation 81 of the preprocessing time (millisecond (ms)) to the CPU usage rate of the edge, and stores the information in the meta-information storage section 120.

In an example of FIG. 17, in a case where the CPU usage rate of the edge corresponding to the relation 81 is 70% at a time of data collection, for example, the preprocessing time of the edge per unit block of the preprocessing target is 10 ms.

Figure 18:
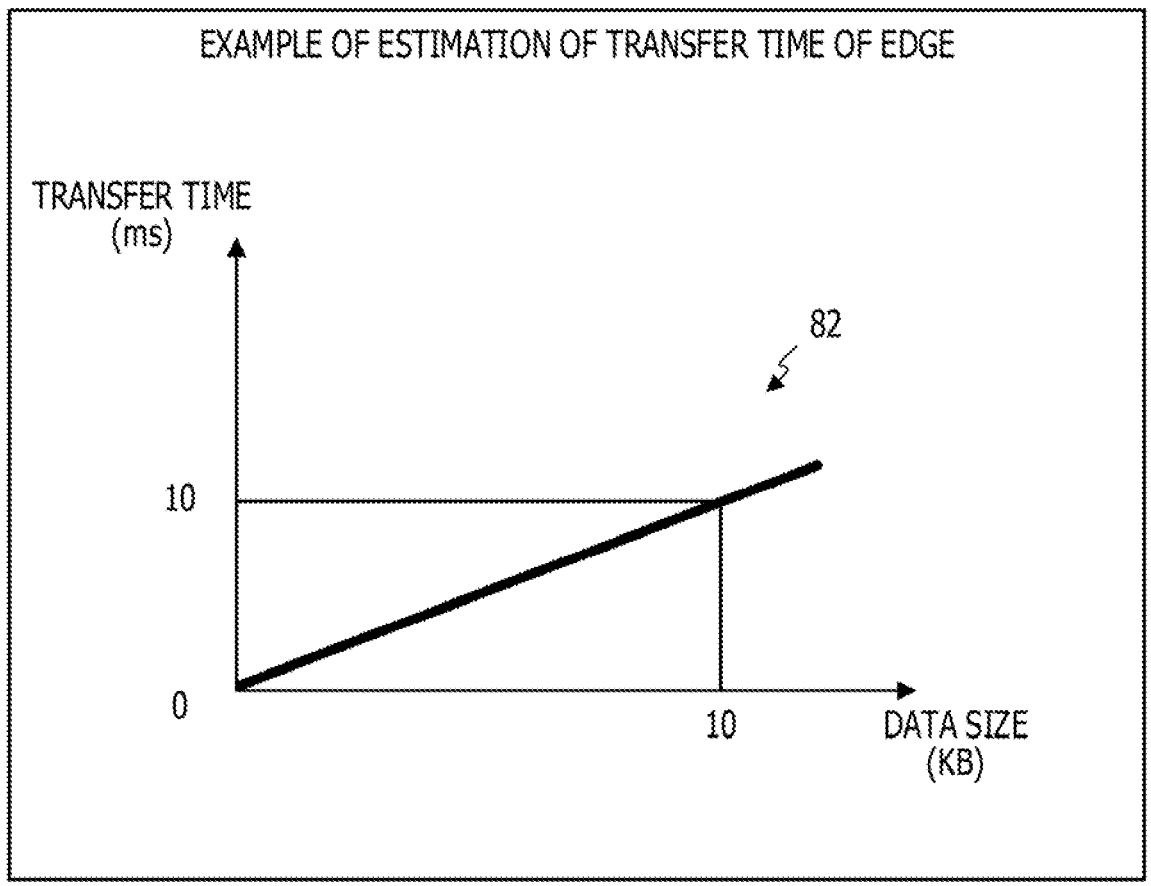
FIG. 18 is a diagram illustrating an example of estimation of a transfer time of an edge.

FIG. 18 is a diagram illustrating an example of estimation of a transfer time of an edge.

The selecting section 140 collects statistical information regarding the network transfer time corresponding to a transfer target data size (size of a unit data block of a transfer target) for each area from each edge in advance. The size of the unit data block of the transfer target is, for example, a size corresponding to data on an average amount of rainfall for one minute. Then, information indicating relation 82 of the network transfer time to the transfer target data size is generated for each set of an edge and an area in advance, and is stored in the meta-information storage section 120.

In an example of FIG. 18, it is indicated that a data transfer time is 10 ms in a case of a transfer target data size of 10 KB for transfer to the server 100 by the edge corresponding to the relation 82 in the area corresponding to the relation 82, for example.

Figure 19:
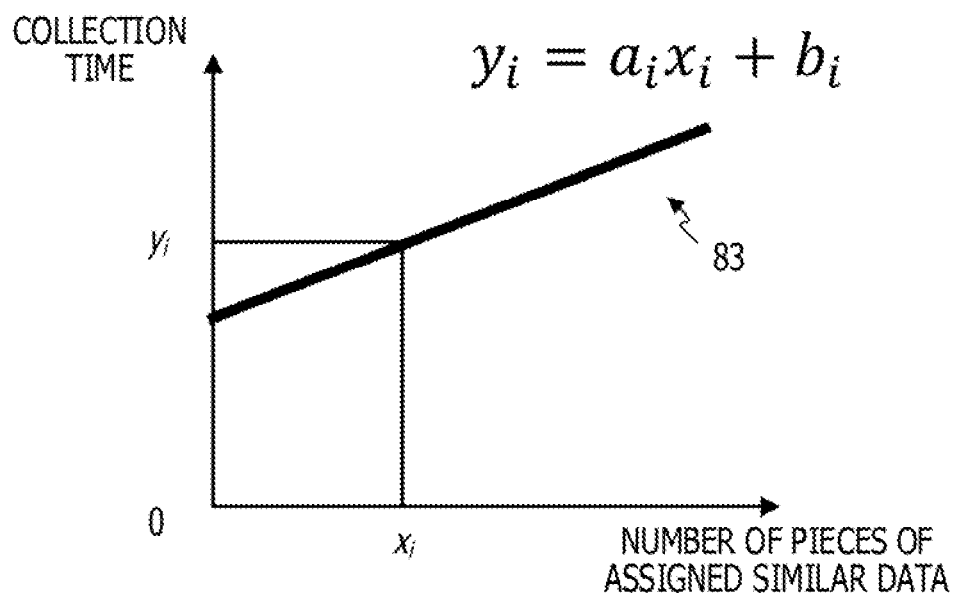
FIG. 19 is a diagram illustrating an example of calculation of a time of data collection from an edge.

FIG. 19 is a diagram illustrating an example of calculation of a time of data collection from an edge.

The selecting section 140 obtains a data collection time yi corresponding to the number of pieces of similar data assigned to each edge by using Equation (1) for each edge.

$$y_i = a_i x_i + b_i \quad (1)$$

where i is an edge ID.

$y_i$ is a time of data collection from an edge having the edge ID "i" (which edge will be referred to as an edge i).

$a_i$ is an increment of the data collection time for each assigned piece of similar data for the edge i. $a_i$=(Preprocessing Time per Unit Block of Preprocessing Target)+ (Network Transfer Time of Preprocessing Result for Unit Block in Question).

$b_i$ is a collection time of unique data (data on preprocessing result) retained by the edge i. $b_i$=(Number of Pieces of Unique Data)×$a_i$.

For example, Equation (1) indicates a time taken for data collection from the edge i when the number of pieces of similar data to be collected from the edge i is set to $x_i$.

A graph 83 in FIG. 19 is an example of a graph corresponding to Equation (1).

Figure 20:
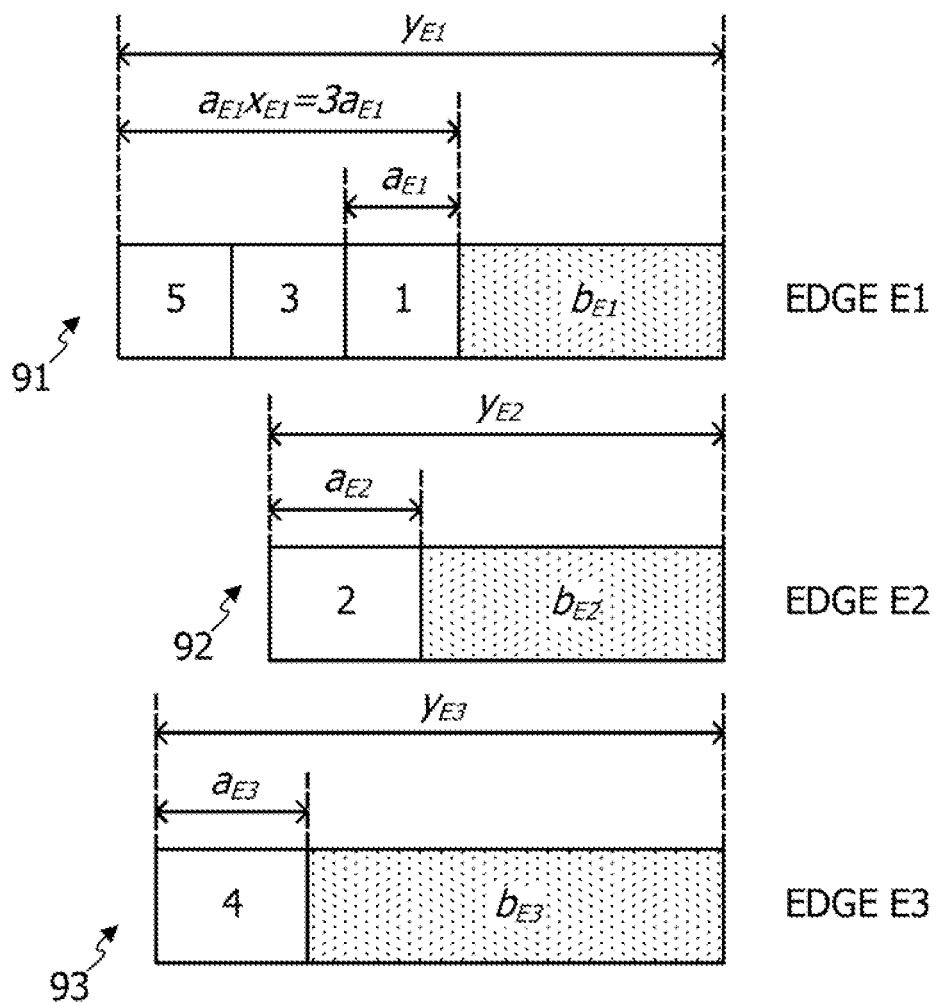
FIG. 20 is a diagram illustrating an example of assignment of similar data to edges.

FIG. 20 is a diagram illustrating an example of assignment of similar data to edges.

FIG. 20 illustrates a case where similar data of time slot IDs "1" to "5" is assigned to the edges E1, E2, and E3. Suppose in the example of FIG. 20 that the edges E1, E2, and E3 mutually retain similar data in the respective time frames of the time slot IDs "1" to "5."

$b_{E1}$ is a collection time of unique data retained by the edge E1. $b_{E2}$ is a collection time of unique data retained by the edge E2. $b_{E3}$ is a collection time of unique data retained by the edge E3. The selecting section 140 calculates $a_{E1}$ for the edge E1 based on the relations 81 and 82 of each edge as illustrated in FIG. 17 and FIG. 18. Similarly, the selecting section 140 calculates $a_{E2}$ for the edge E2, and calculates $a_{E3}$ for the edge E3.

The selecting section 140 assigns the similar data of the respective time slot IDs "1" to "5" to the edges E1, E2, and E3 as follows. Incidentally, numerical values "1," "2," . . . "5" within outlined rectangles in FIG. 20 represent the time slot IDs.

Firstly, the selecting section 140 estimates data collection times in a case of assigning the similar data of the time slot ID "1" to each of the edges E1, E2, and E3. $y_{E1}=a_{E1}+b_{E1}$ for the edge E1. $y_{E2}=a_{E2}+b_{E2}$ for the edge E2. $y_{E3}=a_{E3}+b_{E3}$ for the edge E3. The selecting section 140 compares these three values with each other. $y_{E1}=a_{E1}+b_{E1}$ is a minimum among the three values. Then, the selecting section 140 assigns the similar data of the time slot ID "1" to the edge E1.

Secondly, the selecting section 140 estimates data collection times in a case of assigning the similar data of the time slot ID "2" to each of the edges E1, E2, and E3. $y_{E1}=2a_{E1}+b_{E1}$ for the edge E1. $y_{E2}=a_{E2}+b_{E2}$ for the edge E2. $y_{E3}=a_{E3}+b_{E3}$ for the edge E3. The selecting section 140 compares these three values with each other. $y_{E2}=a_{E2}+b_{E2}$ is a minimum among the three values. Then, the selecting section 140 assigns the similar data of the time slot ID "2" to the edge E2.

Thirdly, the selecting section 140 estimates data collection times in a case of assigning the similar data of the time slot ID "3" to each of the edges E1, E2, and E3. $y_{E1}=2a_{E1}+b_{E1}$ for the edge E1. $y_{E2}=2a_{E2}+b_{E2}$ for the edge E2. $y_{E3}=a_{E3}+b_{E3}$ for the edge E1. The selecting section 140 compares these three values with each other. $y_{E1}=2a_{E1}+b_{E2}$ is a minimum among the three values. Then, the selecting section 140 assigns the similar data of the time slot ID "3" to the edge E1.

Fourthly, the selecting section 140 estimates data collection times in a case of assigning the similar data of the time slot ID "4" to each of the edges E1, E2, and E3. $y_{E1}=3a_{E1}+b_E$ for the edge E1. $y_{E2}=2a_{E2}+b_{E2}$ for the edge E2. $y_{E3}=a_{E3}+b_{E3}$ for the edge E1. The selecting section 140 compares these three values with each other. $y_{E3}=a_{E3}+b_{E3}$ is a minimum among the three values. Then, the selecting section 140 assigns the similar data of the time slot ID "4" to the edge E1.

Fifthly, the selecting section 140 estimates data collection time in a case of assigning the similar data of the time slot ID "5" to each of the edges E1, E2, and E3. $y_{E1}=3a_{E1}+b_{E1}$ for the edge E1. $y_{E2}=2a_{E2}+b_{E2}$ for the edge E2. $y_{E3}=2a_{E3}+b_{E3}$ for the edge E3. The selecting section 140 compares these three values with each other. $y_{E1}=3a_{E1}+b_{E1}$ is a minimum among the three values. Then, the selecting section 140 assigns the similar data of the time slot ID "5" to the edge E1.

A bar 91 indicates a data collection time $y_{E1}$ after the assignment to the edge E1. A bar 92 indicates a data collection time $y_{E2}$ after the assignment to the edge E2. A bar 93 indicates a data collection time $y_{E3}$ after the assignment to the edge E3.

Thus, the similar data of the time slot IDs "1" to "5" is assigned to the edges E1, E2, and E3 so as to level the times of data collection from the edges E1, E2, and E1.

A processing procedure of the server 100 will next be described.

Figure 21:
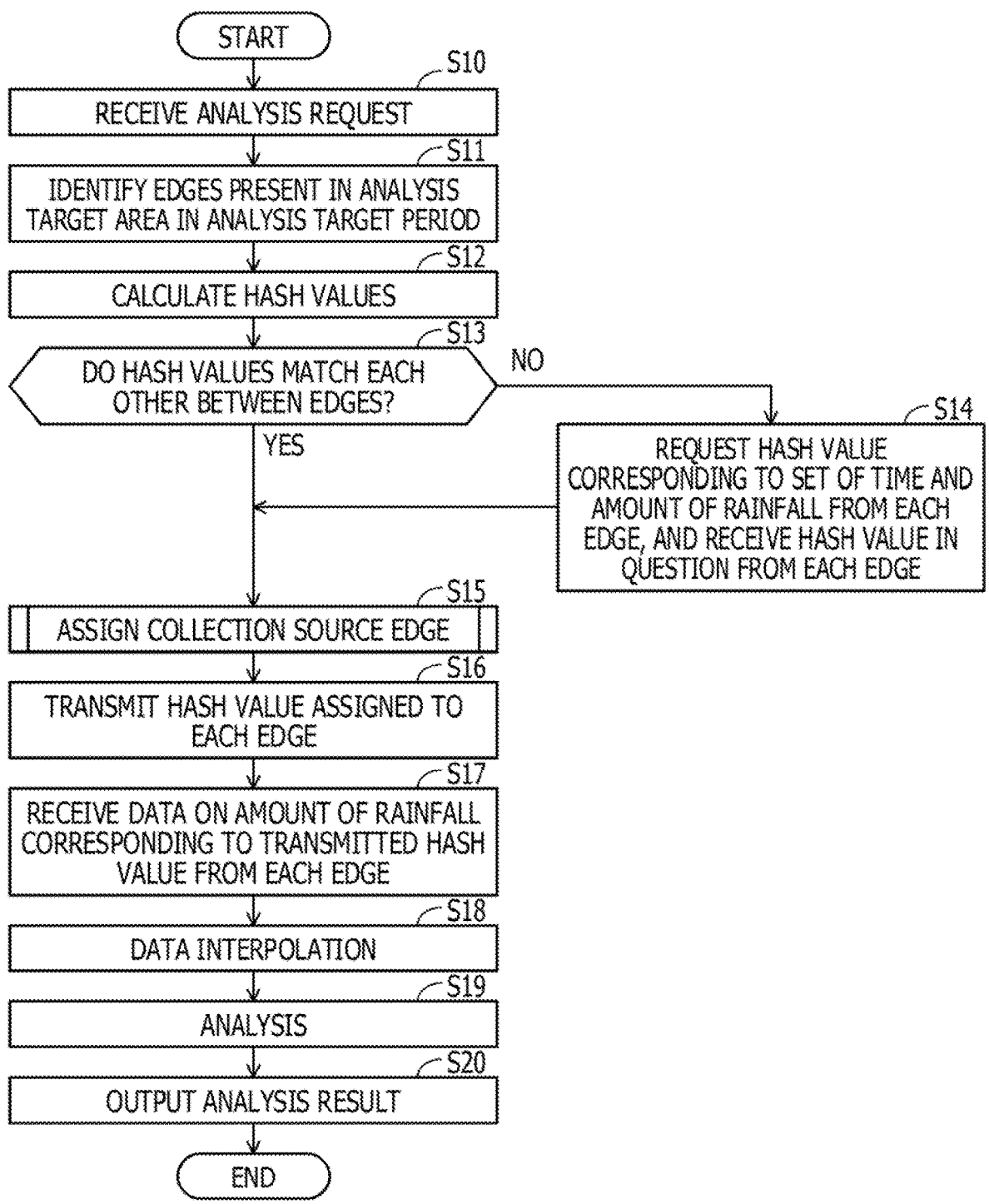
FIG. 21 is a flowchart illustrating an example of processing of a server.

FIG. 21 is a flowchart illustrating an example of processing of a server.

(S10) The selecting section 140 receives a rainfall amount analysis request of the user. The analysis request includes information indicating an analysis target period and a region.

(S11) The selecting section 140 identifies a plurality of analysis target areas included in the specified region in the analysis target period specified by the analysis request. The selecting section 140 identifies edges present in each analysis target area in the analysis target period.

(S12) The selecting section 140 generates the hash value table 121a by calculating the hash value of each edge for each time frame (time slot) of the analysis target period based on the edge history table of each edge identified in step S11. As described earlier, input to the hash function used to obtain a hash value is a time corresponding to the time frame in question (for example, a time of a start of the time frame) and identification information of an area in which the edge in question is present.

(S13) The selecting section 140 determines whether or not hash values match each other between edges. When hash values match each other between edges, the processing proceeds to step S15. When there are no hash values matching each other between edges, the processing proceeds to step S14. Here, when there are hash values matching each other between edges in step S13, it means that a plurality of edges present in a same area in a same time frame may be extracted. When there are no hash values matching each other between edges in step S13, on the other hand, it means that only a single edge is present in a same area in a same time frame. The selecting section 140 may, for example, determine whether or not there is similar data mutually retained by a plurality of edges for each time slot by determining whether or not there are hash values matching each other between edges for each time slot.

(S14) The selecting section 140 requests hash values corresponding to sets of times and amounts of rainfall from each edge, and receives the hash values from each edge. In this case, the selecting section 140 makes each edge perform preprocessing for data on the amounts of rainfall in the target period, and requests the hash values calculated for preprocessing results. Amounts of rainfall measured by some edges in a certain time frame are expected to match each other within a given error. Those edges may be said to mutually retain similar data, and thus the processing of step S15 to be described later may be performed.

(S15) The selecting section 140 assigns a collection source edge for similar data. Details of a procedure for assigning a collection source edge for similar data will be described later.

(S16) The collecting section 150 transmits a hash value corresponding to similar data assigned to each collection source edge by the selecting section 140.

(S17) The collecting section 150 receives data on an amount of rainfall corresponding to the transmitted hash value from each collection source edge.

(S18) By using the data on the amount of rainfall collected from each collection source edge, the collecting section 150 generates interpolation data for the similar data not collected (excluded) from each edge, and completes data on amounts of rainfall in each edge with the interpolation data.

(S19) The analyzing section 160 analyzes the data on the amounts of rainfall obtained by the collecting section 150.

(S20) The analyzing section 160 outputs a result of the analysis of the data on the amounts of rainfall. The processing of the server 100 is then ended.

Incidentally, the hash values obtained in step S14 may not match each other between any edges. In that case, the selecting section 140 may determine that data on all of amounts of rainfall in the obtainment target period is to be collected from all edges.

Figure 22:
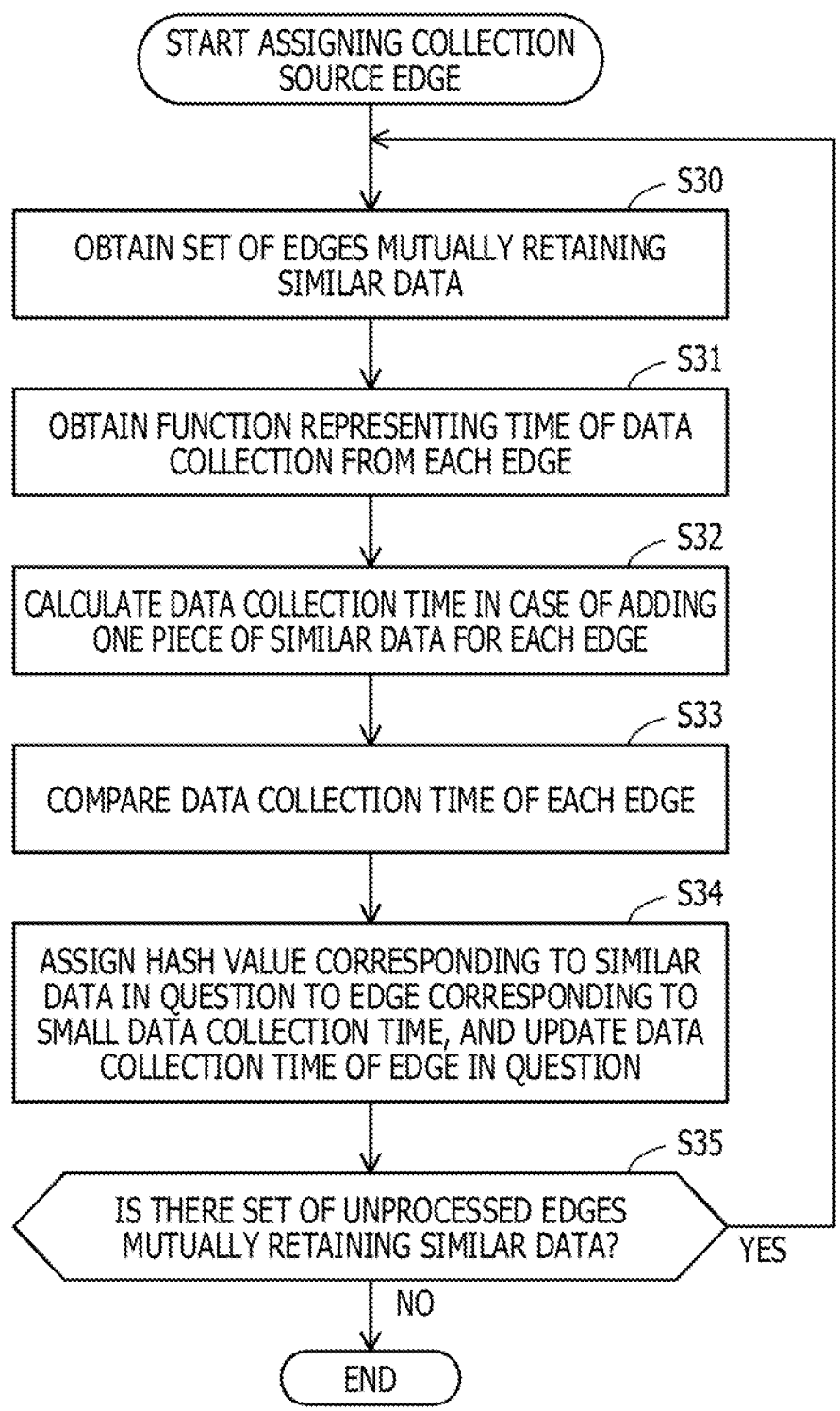
FIG. 22 is a flowchart illustrating an example of assignment of a collection source edge.

FIG. 22 is a flowchart illustrating an example of assignment of a collection source edge.

The assignment of a similar data collection source edge corresponds to step S15.

(S30) The selecting section 140 obtains a set of edges mutually retaining similar data. When there is a set of identical hash values in a certain time slot, for example, a set of edges corresponding to the set of the identical hash values is the set of the edges mutually retaining similar data.

(S31) The selecting section 140 obtains a function representing a data collection time from each obtained edge. For example, the function is generated for each edge in advance, and is stored in the meta-information storage section 120.

(S32) The selecting section 140 calculates a data collection time in a case of adding one piece of similar data for each edge obtained in step S30 based on the function obtained in step S31.

(S33) The selecting section 140 compares the data collection times of the respective edges, the data collection times being calculated in step S32, with each other.

(S34) The selecting section 140 assigns a hash value corresponding to the similar data in question to an edge corresponding to a small data collection time, and updates the data collection time of the edge in question.

(S35) The selecting section 140 determines whether or not there is an unprocessed set of edges (for example, a set of edges for which the procedure of steps S31 to S34 has not been performed) mutually retaining similar data. When there is an unprocessed set of edges mutually retaining similar data, the processing proceeds to step S30. When there is no unprocessed set of edges mutually retaining similar data, the assignment of a collection source edge for similar data is ended.

Thus, at a time of the assignment of a collection source edge, the selecting section 140 assigns one of two or more edges present in a certain area in a certain time frame as a collection source of similar data (data block) in the area in the time frame.

A condition used by the selecting section 140 at the time of the assignment is the leveling of transmission cost of all of data blocks (similar data or unique data) for which a plurality of edges are respectively assigned as a collection source. The selecting section 140 calculates a cost of transmission by each of two or more edges retaining a data block in a set of a certain time frame and a certain area in a case where the edge is set as a collection source of the data block, and assigns an edge corresponding to a minimum calculated transmission cost as the collection source.

An example of the transmission cost is the leveling of a time of data collection from each edge. The selecting section 140 calculates the time of data collection from each edge based on a preprocessing time according to a load on each edge for generation of the data block by each of the plurality of edges and a data transfer time according to an area in which each of the plurality of edges is present.

At the time of the assignment of an edge, the selecting section 140 calculates a hash value corresponding to a set of a time frame and an area based on history information regarding the presence positions of the plurality of edges. The selecting section 140 determines that a set of edges to which the hash value is common as a set of edges commonly retaining a data block (similar data) corresponding to the set of the time frame and the area. By thus using a hash value, a set of edges mutually retaining similar data may be extracted quickly.

By the procedure illustrated in FIG. 22, it is possible to level the time of data collection from each edge, and assign similar data collection source edges, as described with reference to FIG. 20. For example, as illustrated in FIG. 20, the selecting section 140 may perform the procedure of steps S30 to S35 while selecting a set of edges mutually retaining similar data in a time series of time slots. The order of the time series may be a direction from an old direction to a new direction, or may be a direction from a new direction to an old direction.

Incidentally, as illustrated in step S14 in FIG. 21, when two or more edges are not present for any set of a time frame and an area, the selecting section 140 collects hash values corresponding to data blocks retained by a plurality of edges and times corresponding to the data blocks from the plurality of edges, respectively. Then, from a set of edges that transmit a common hash value, the selecting section 140 assigns an edge as a collection source of the data block (similar data) corresponding to the time in question. The collecting section 150 collects the data blocks (similar data) from edges assigned as a collection source for each time in question.

Description will next be made of an example of a similar data search based on step S14 in FIG. 21.

Figure 23:
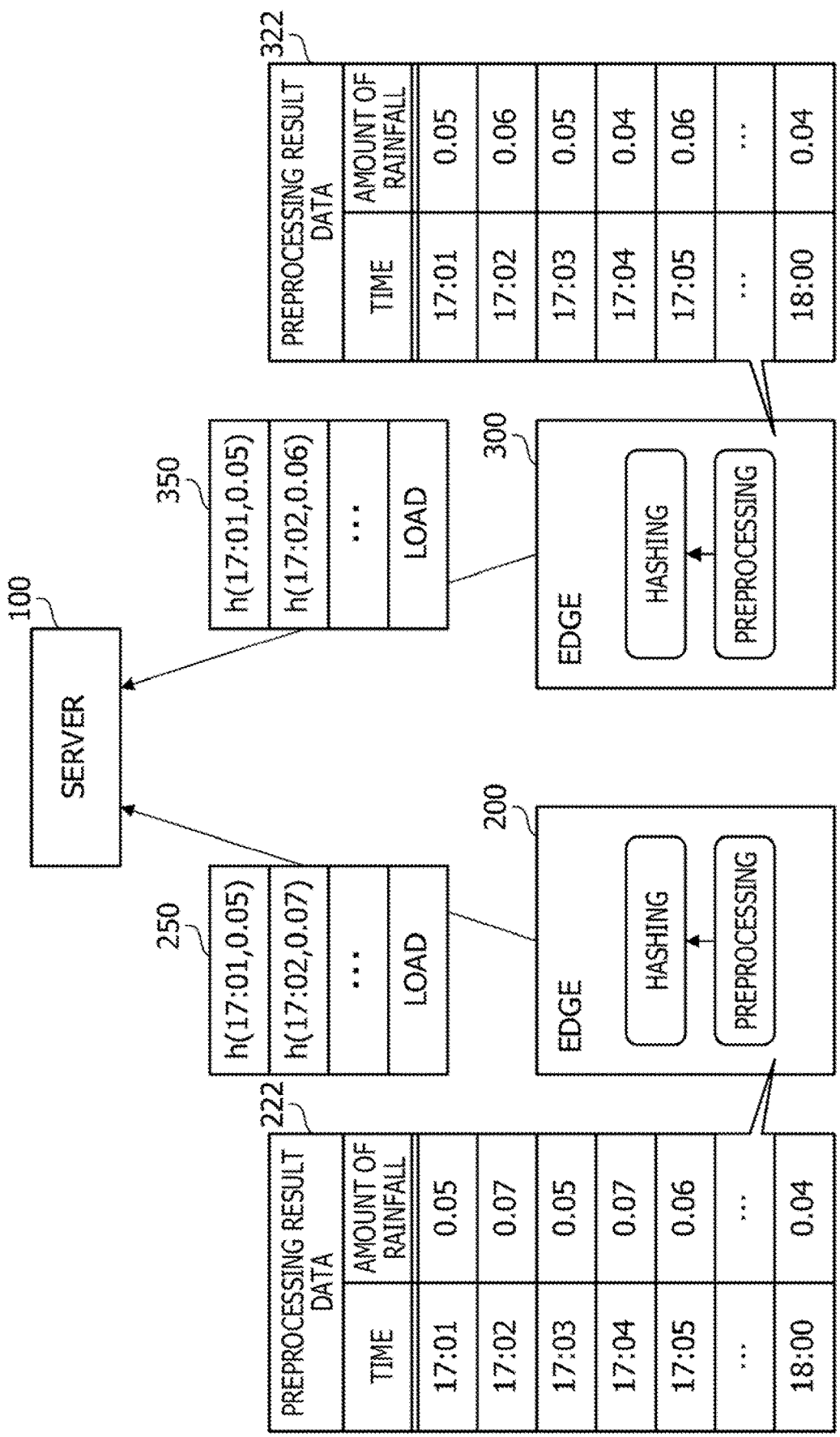
FIG. 23 is a diagram illustrating an example of a similar data search using raw data of edges.

FIG. 23 is a diagram illustrating an example of a similar data search using raw data of edges.

In a case where there are no edges having matching hash values corresponding to a time and an area (in a case where there is no correlation between pieces of data retained by edges or there are a plurality of correlation parameters) from the history of times and areas of each edge, the server 100 collects hash values corresponding to times and raw data from each edge. The raw data is data on preprocessing results. In this case, the server 100 requests each edge to perform preprocessing specifying collection target times and areas and transmit hash values corresponding to the times and the preprocessing for the respective times. Each edge performs the preprocessing.

FIG. 23 illustrates preprocessing result data 222 of the edge 200 and preprocessing result data 322 of the edge 300. The hashing processing section (for example, the hashing processing section 240) of each edge calculates hash values corresponding to the times and preprocessing results for the respective times, and transmits the hash values to the server 100. For example, the edge 200 transmits data 250 including hash values h(17:01, 0.05), h(17:02, 0.07), . . . and a load on the edge 200 at a present time to the server 100. In addition, the edge 300 transmits data 350 including hash values h(17:01, 0.05), h(17:02, 0.06), . . . and a load on the edge 300 at the present time to the server 100.

In this case, the server 100 searches for similar data based on the hash values received from each edge. In the above example, the server 100 may determine that the edges 200 and 300 mutually retain similar data corresponding to the hash value h(17:01, 0.05). Hence, it suffices for the server 100 to collect the similar data from one of the edges 200 and 300.

In the case where a similar data search using raw data is performed as in FIG. 23, preprocessing is already performed on the edge sides. It therefore suffices for the collecting section 150 to perform steps S31 to S34 in FIG. 22 in consideration of only the data transfer time of the preprocessing time and the data transfer time.

FIG. 24 is a diagram illustrating an example of data collection from edges by a server.

The server 100 transmits hash values corresponding to similar data assigned to edges to the respective edges, and collects data corresponding to the hash values from the respective edges. Suppose, for example, that the server 100 assigns the edge 200 as a collection source of similar data related to an area A at 17:02, similar data related to an area B at 17:04, and similar data related to an area C at 17:05. In this case, the server 100 transmits, to the edge 200, request data 151 including hash values h(17:02, A), h(17:04, B), and h(17:05, C) corresponding to the respective pieces of similar data assigned to the edge 200.

The edge 200 generates preprocessing result data 223 by preprocessing the sensor data stored in the sensor information storage section 210. The edge 200 checks hash values corresponding to times and areas in the preprocessing result data 223 against the hash values included in the request data 151, extracts rainfall amount data (data blocks) corresponding to matching hash values from the preprocessing result data 223, and transmits the rainfall amount data to the server 100. In this case, the edge 200 transmits, to the server 100, rainfall amount data related to the area A at 17:02, rainfall amount data related to the area B at 17:04, and rainfall amount data related to the area C at 17:05.

Suppose that the server 100 similarly assigns the edge 300 as a collection source of similar data related to the area A at 17:01, similar data related to the area B at 17:02, similar data related to the area B at 17:03, and similar data related to an area D at 17:05. In this case, the server 100 transmits, to the edge 300, request data 152 including hash values h(17:01, A), h(17:02, B), h(17:03, B), and h(17:05, D) corresponding to the respective pieces of similar data assigned to the edge 300.

The edge 300 generates preprocessing result data 323 by preprocessing the sensor data stored in the sensor information storage section of the edge 300. The edge 300 checks hash values corresponding to times and areas in the preprocessing result data 323 against the hash values included in the request data 152, extracts rainfall amount data corresponding to matching hash values from the preprocessing result data 323, and transmits the rainfall amount data to the server 100. In this case, the edge 300 transmits, to the server 100, rainfall amount data related to the area A at 17:01, rainfall amount data related to the area B at 17:02, rainfall amount data related to the area B at a 17:03, and rainfall amount data related to the area D at 17:05.

Thus, the server 100 may collect the similar data retained by the respective edges without duplicates. At this time, according to the procedure of FIG. 22, times of data collection from the respective edges are leveled as follows.

Figure 25A:
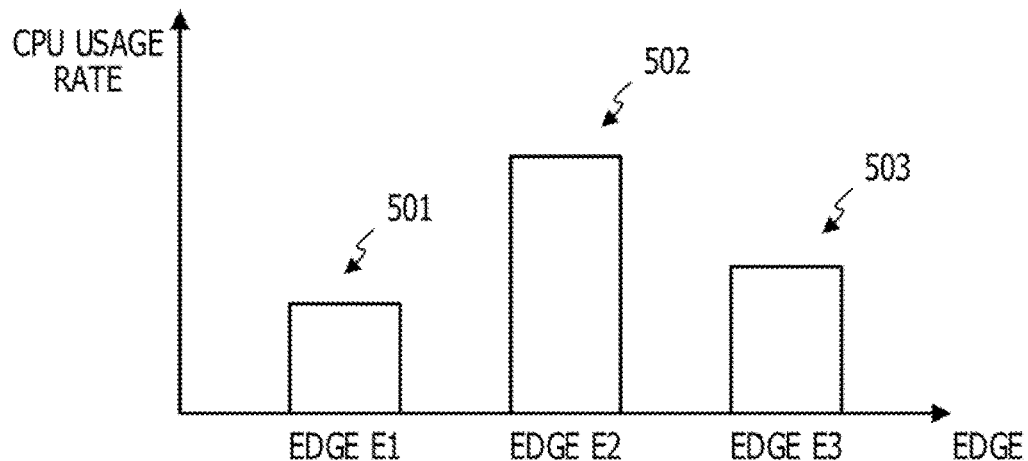
FIGS. 25A, 25B, and 25C are diagrams illustrating an example of leveling of data collection times.
Figure 25B:
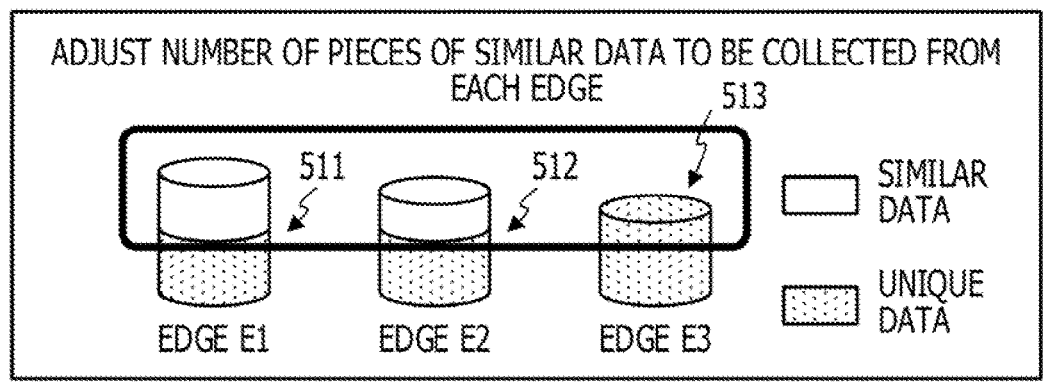
Figure 25C:
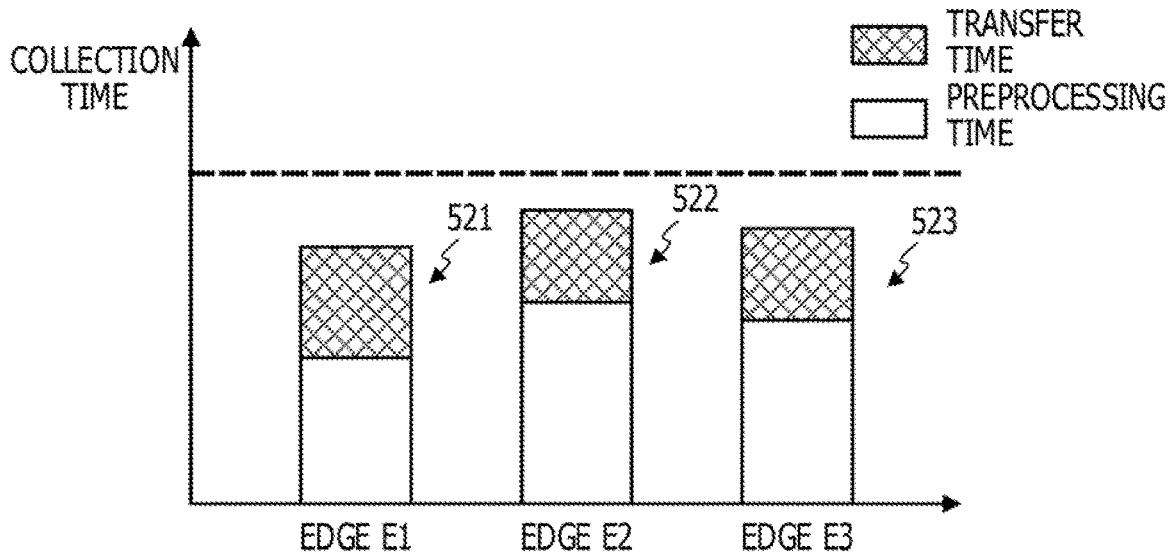

FIGS. 25A to 25C are diagrams illustrating an example of leveling of data collection times.

FIG. 25A illustrates a CPU usage rate 501 of the edge E1, a CPU usage rate 502 of the edge E2, and a CPU usage rate 503 of the edge E3. According to FIG. 25A, a load on the edge E2 among the three edges is highest, a load on the edge E3 is next highest, and a load on the edge E1 is lowest.

FIG. 25B illustrates examples 511, 512, and 513 of assignment of similar data to the edges E1, E2, and E3 by the server 100 in the case of the loads illustrated in FIG. 25A. The assignment example 511 is an example of assignment to the edge E1. The assignment example 512 is an example of assignment to the edge E2. The assignment example 513 is an example of assignment to the edge E3. The number of pieces of similar data collected from the edge E1 is largest, the number of pieces of similar data collected from the edge E2 is second largest, and the number of pieces of similar data collected from the edge E3 is smallest. Instead, the edge E3 retains most unique data, and thus much unique data is collected from the edge E3.

FIG. 25C illustrates an example of times of data collection from the respective edges in the case of adjusting the number of pieces of similar data to be collected from each edge as in FIG. 25B under the loads illustrated in FIG. 25A by the procedure of FIG. 22. A data collection time 521 is a time of data collection from the edge E1. A data collection time 522 is a time of data collection from the edge E2. A data collection time 523 is a time of data collection from the edge E3. As described earlier, a data collection time is a sum of a preprocessing time and a transfer time. FIG. 25C indicates that the times of data collection from the respective edges are leveled.

Description will next be made of a comparative example of data collection.

Figure 26A:
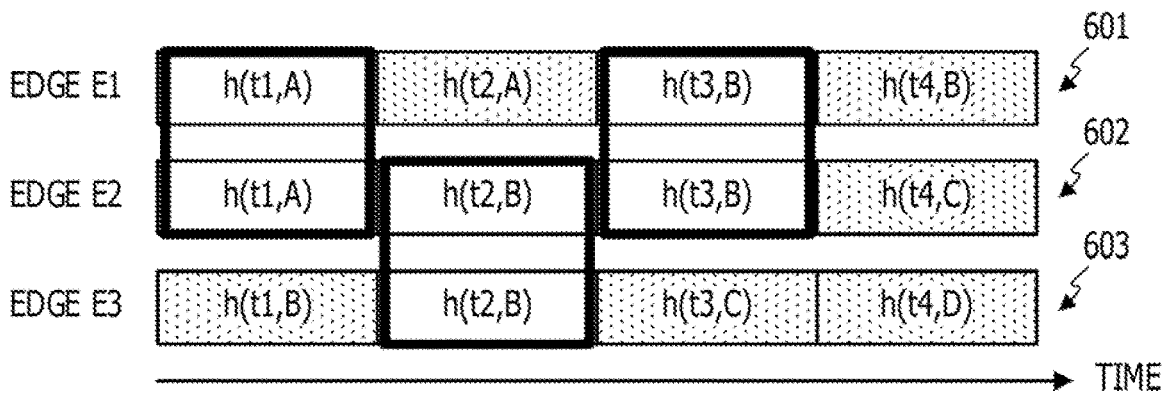
FIGS. 26A and 26B are diagrams illustrating a comparative example of data collection.
Figure 26B:
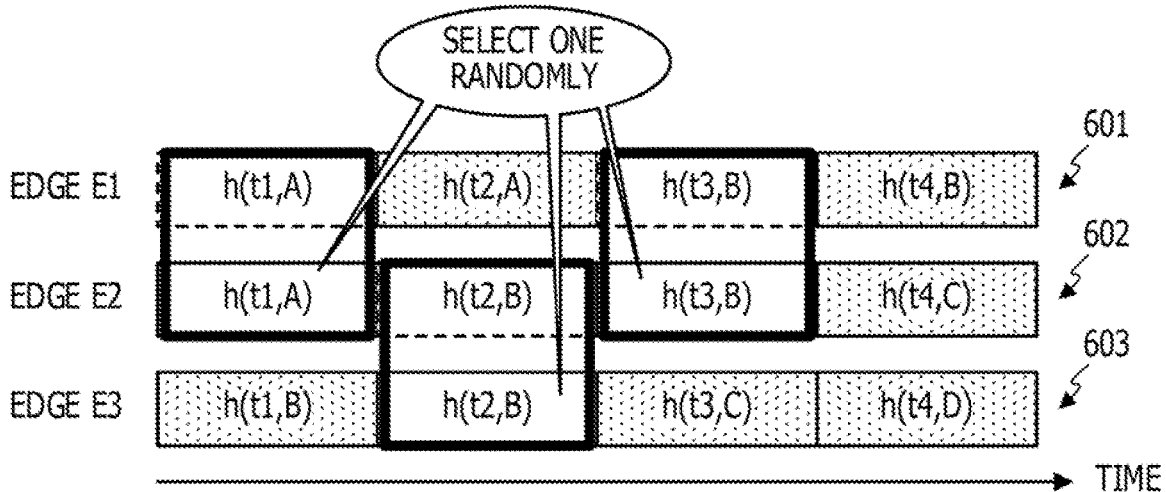

FIGS. 26A and 26B are diagrams illustrating a comparative example of data collection.

FIG. 26A illustrates a hash value group 601 corresponding to data retained by the edge E1 for times t1 to t4, a hash value group 602 corresponding to data retained by the edge E2 for the times t1 to t4, and a hash value group 603 corresponding to data retained by the edge E3 for the times t1 to t4. A hash function in each hash value group is h(time, value (area identification information)).

For example, according to FIG. 26A, the edges E1 and E2 mutually retain similar data for the time t1 and the area A. The edges E2 and E3 mutually retain similar data for the time t2 and the area B. The edges E1 and E2 mutually retain similar data for the time t3 and the area B. There is unique data for sets of the other times and areas.

At this time, for example, one edge as a collection source of each piece of similar data may be selected randomly for each piece of similar data. In this case, however, there is a possibility of relatively large differences between times of data collection from the respective edges. For example, suppose that the edge E2 is selected as a collection source of the similar data corresponding to a hash value (t1, A), that the edge E3 is selected as a collection source of the similar data corresponding to a hash value h(t2, B), and that the edge E2 is selected as a collection source of the similar data corresponding to a hash value (t3, B). In this case, times of data collection from the edges E1, E2, and E3 are as follows.

Figure 27:
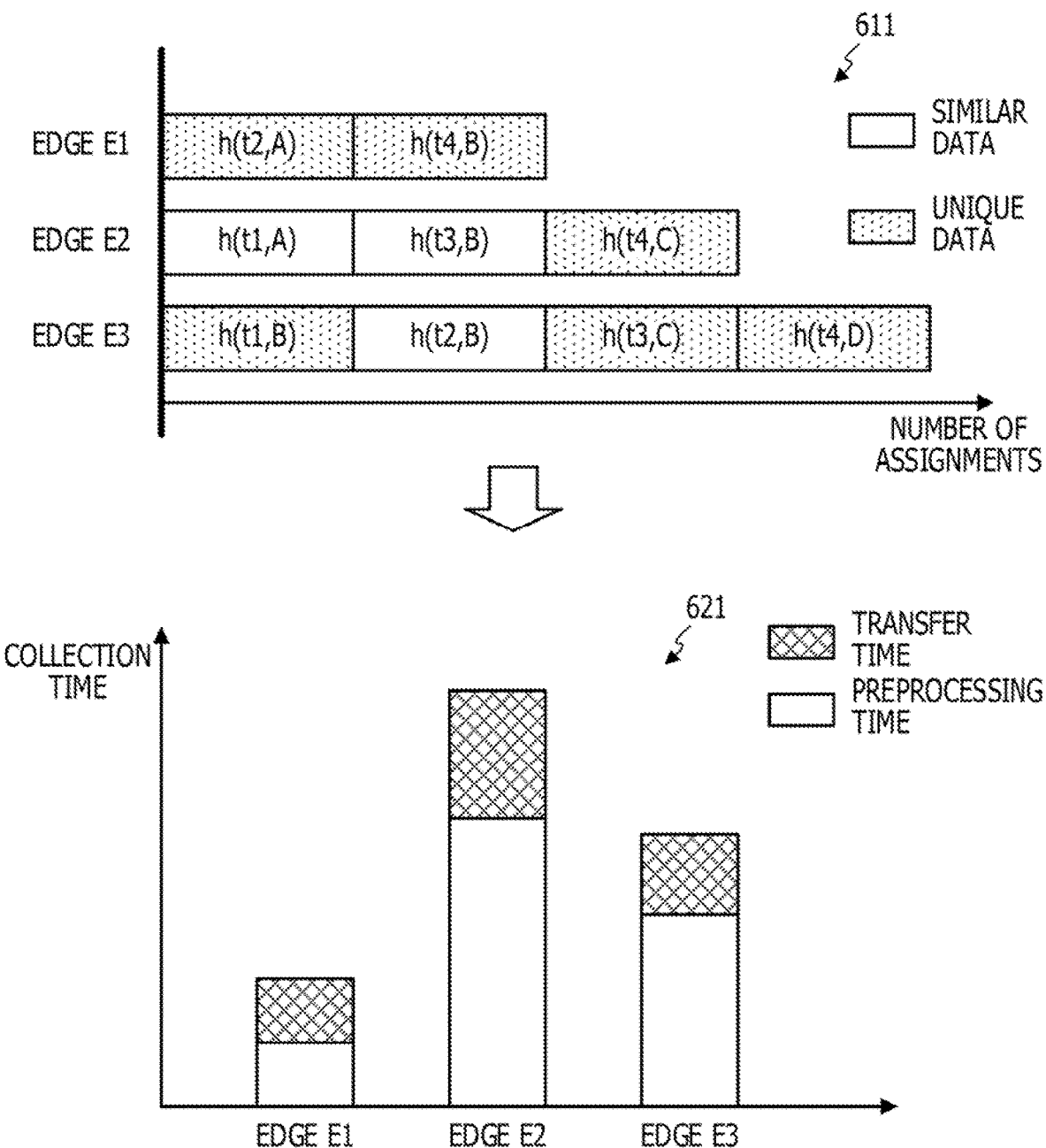
FIG. 27 is a diagram illustrating a comparative example (continued) of data collection.

FIG. 27 is a diagram illustrating a comparative example (continued) of data collection.

A graph 611 illustrates the number of assignments of collection target data (similar data and unique data) to the edges E1, E2, and E3 in a case where collection sources are assigned as in FIG. 26B. The number of assignments to the edge E1 is 2. The number of assignments to the edge E2 is 3. The number of assignments to the edge E3 is 4.

A graph 621 illustrates times of data collection from the edges E1, E2, and E3 in this case. When edges as data collection sources of the similar data are thus selected randomly, relatively large differences occur between the times of data collection from the respective edges.

Because analysis processing in a subsequent stage becomes possible after data collection from all of the edges, the differences between the data collection times become a factor in delaying a start time of the analysis processing after the data collection. The data collection times may be shortened by assigning edges as similar data collection sources so as to reduce the differences between the data collection times as in FIG. 25C, for example. As a result, the analysis processing in the subsequent stage may be started quickly, and thus the speed of a series of processing from the data collection to analysis may be increased.

Incidentally, a time taken to generate a calculation equation for estimating the data collection times from the respective edges does not constitute overhead. The generation of the calculation equation may be performed in parallel with the processing of identifying edges mutually retaining similar data based on hash values.

Further, as illustrated in the second embodiment, a more detailed amount of rainfall for each region may be obtained by combining an amount of rainfall measured by a vehicle-mounted raindrop sensor with information regarding an amount of rainfall from an existing regional weather observation system, a radar, or the like.

Incidentally, in the example of the second embodiment, the preprocessing times are estimated based on loads (CPU usage rates) on respective edges, and edges as similar data collection sources are selected. On the other hand, another example is also considered as a method of selecting similar data collection sources.

Figure 28:
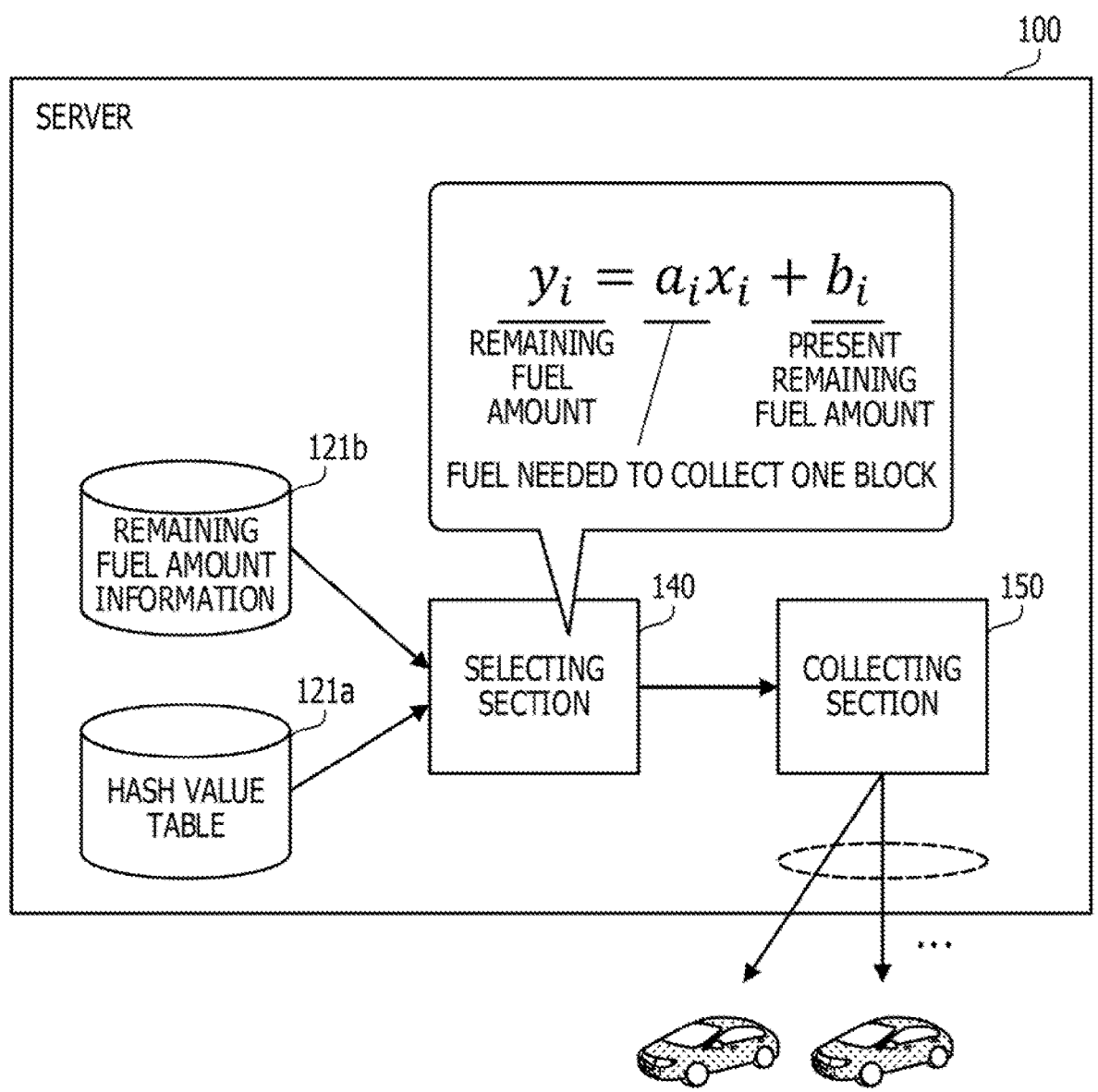
FIG. 28 is a diagram illustrating another example of selection of similar data collection sources.

FIG. 28 is a diagram illustrating another example of selection of similar data collection sources.

The server 100, for example, retains remaining fuel amount information 121b indicating remaining fuel amounts at a present time of respective edges. The selecting section 140 may select edges as similar data collection sources so as to level the remaining fuel amounts of the respective edges by extracting a combination of edges mutually retaining similar data from the hash value table 121a, and replacing the CPU usage rates in the method illustrated with reference to FIGS. 17 to 20 with the remaining fuel amounts of the edges.

In this case, it suffices to consider yi in Equation (1) as the remaining fuel amount of an edge, ai as a fuel needed to collect one block from the edge (amount of decrease in fuel), and bi as the present remaining fuel amount of the edge. The collecting section 150 may perform data collection so as to level the remaining fuel amounts of the respective edges by collecting data from the collection sources assigned by the selecting section 140. In addition, the leveling target parameter may, for example, be a fuel consumption, an amount of power consumption, or the like.

Incidentally, the information processing of the first embodiment may be implemented by making the processing section 12 execute a program. In addition, the information processing of the second embodiment may be implemented by making the CPU 101 perform a program. The programs may be recorded on the computer readable recording medium 113.

For example, the programs may be distributed by distributing the recording medium 113 on which the programs are recorded. In addition, the programs may be stored in another computer in advance, and the programs may be distributed via a network. A computer may, for example, store (install) the programs recorded on the recording medium 113 or the programs received from the other computer into a storage device such as the RAM 102, the HDD 103, or the like, read the programs from the storage device, and execute the programs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A non-transitory computer-readable storage medium storing a data collecting program for making a process performed, the process comprising:
  identifying a data obtainment target period that includes a plurality of time frames and a plurality of areas based on a request from a user;

extracting a plurality of apparatuses present in a first area of the plurality of areas in each of the plurality of time frames;

assigning a first apparatus included in the plurality of apparatuses as a collection source of a data block corresponding to a first set of a first time frame included in the plurality of time frames and the first area based on a given condition from among the extracted plurality of apparatuses;

assigning a second apparatus included in the plurality of apparatuses as the collection source of the data block corresponding to a second set of a second time frame included in the plurality of time frames and the first area included in the plurality of areas based on the given condition from among the extracted plurality of apparatuses, the second apparatus being different from the first apparatus; and collecting the data block from the first apparatus and the second apparatus assigned as the collection source.

2. The non-transitory computer-readable storage medium according to claim 1, wherein assigning the first apparatus assigns one of two or more apparatuses present in the first area in the first time frame as the collection source of the data block in the first area in the first time frame.

3. The non-transitory computer-readable storage medium according to claim 1, wherein the given condition is leveling of transmission cost of all of data blocks for which the plurality of apparatuses are respectively assigned as a collection source, and assigning the first apparatus calculates the transmission cost of transmission by each of two or more apparatuses retaining the data block in the first set of the first time frame and the first area in a case where the first apparatus is set as the collection source of the data block, and assigns an apparatus corresponding to a minimum calculated transmission cost as the collection source.

4. The non-transitory computer-readable storage medium according to claim 3, wherein the transmission cost is a time of collection of data from each apparatus, and calculating the transmission cost calculates the time of collection of the data from each apparatus based on a preprocessing time according to a load on each apparatus for generation of the data block by each of the plurality of apparatuses and a data transfer time according to an area in which each of the plurality of apparatuses is present.

5. The non-transitory computer-readable storage medium according to claim 1, wherein assigning the first apparatus calculates a hash value corresponding to the first set of the first time frame and the first area based on history information regarding presence positions of the plurality of apparatuses, and determines that a set of apparatuses to which the hash value is common is a set of apparatuses commonly retaining the data block corresponding to the first set of the first time frame and the first area.

6. The non-transitory computer-readable storage medium according to claim 1, wherein when two or more apparatuses are not present for any set of a time frame and an area, hash values corresponding to data blocks retained by the plurality of apparatuses and times corresponding to the data blocks are collected from the plurality of apparatuses, respectively, from a set of apparatuses that transmits a common hash value, an apparatus as the collection source of the data block corresponding to the time is assigned, and the data blocks are collected from apparatuses assigned as a collection source for each of the times.

7. The non-transitory computer-readable storage medium according to claim 1, wherein the plurality of apparatuses are movable.

8. A data collecting device comprising:

a memory; and circuitry coupled to the memory and configured to identify a data obtainment target period that includes a plurality of time frames and a plurality of areas based on a request from a user, extract a plurality of apparatuses present in a first area of the plurality of areas in each of the plurality of time frames, assign a first apparatus included in the plurality of apparatuses as a collection source of a data block corresponding to a first set of a first time frame included in the plurality of time frames and the first area based on a given condition from among the extracted plurality of apparatuses, assign a second apparatus included in the plurality of apparatuses as the collection source of the data block corresponding to a second set of a second time frame included in the plurality of time frames and the first area included in the plurality of areas based on the given condition from among the extracted plurality of apparatuses, the second apparatus being different from the first apparatus; and collect the data block from the first apparatus and the second apparatus assigned as the collection source.

9. The data collecting device according to claim 8, wherein the circuitry assigns one of two or more apparatuses present in the first area in the first time frame as the collection source of the data block in the first area in the first time frame.

10. The data collecting device according to claim 8, wherein the given condition is leveling of transmission cost of all of data blocks for which the plurality of apparatuses are respectively assigned as a collection source, and the circuitry calculates the transmission cost of transmission by each of two or more apparatuses retaining the data block in the first set of the first time frame and the first area in a case where the first apparatus is set as the collection source of the data block, and assigns an apparatus corresponding to a minimum calculated transmission cost as the collection source.

11. The data collecting device according to claim 10, wherein the transmission cost is a time of collection of data from each apparatus, and the circuitry calculates the time of collection of the data from each apparatus based on a preprocessing time according to a load on each apparatus for generation of the data block by each of the plurality of apparatuses and a data transfer time according to an area in which each of the plurality of apparatuses is present.

12. The data collecting device according to claim 8, wherein the circuitry calculates a hash value corresponding to the first set of the first time frame and the first area based on history information regarding presence positions of the plurality of apparatuses, and determines that a set of apparatuses to which the hash value is common is a set of apparatuses commonly retaining the data block corresponding to the first set of the first time frame and the first area.

13. The data collecting device according to claim 8, wherein
when two or more apparatuses are not present for any set of a time frame and an area, the circuitry collects hash values corresponding to data blocks retained by the plurality of apparatuses and times corresponding to the data blocks from the plurality of apparatuses, respectively,
from a set of apparatuses that transmits a common hash value, the circuitry assigns an apparatus as the collection source of the data block corresponding to the time, and
the circuitry collects the data blocks from apparatuses assigned as a collection source for each of the times.

14. The data collecting device according to claim 8, wherein the plurality of apparatuses are movable.

15. A data collecting method performed by a computer, the data collecting method comprising:
identifying a data obtainment target period that includes a plurality of time frames and a plurality of areas based on a request from a user;
extracting a plurality of apparatuses present in a first area of the plurality of areas in each of the plurality of time frames;
assigning a first apparatus included in the plurality of apparatuses as a collection source of a data block corresponding to a first set of a first time frame included in the plurality of time frames and the first area based on a given condition from among the extracted plurality of apparatuses;
assigning a second apparatus included in the plurality of apparatuses as the collection source of the data block corresponding to a second set of a second time frame included in the plurality of time frames and the first area included in the plurality of areas based on the given condition from among the extracted plurality of apparatuses, the second apparatus being different from the first apparatus; and
collecting the data block from the first apparatus and the second apparatus assigned as the collection source.

* * * * *